United States Patent
Popham et al.

(10) Patent No.: US 9,987,924 B2
(45) Date of Patent: *Jun. 5, 2018

(54) VEHICLE HAVING WADE SENSING DISPLAY AND SYSTEM THEREFOR

(71) Applicant: Jaguar Land Rover Limited, Whitley, Coventry, Warwickshire (GB)

(72) Inventors: Thomas Popham, Chapelfields (GB); Sebastian Paszkowicz, Coventry (GB); Jonathan Woodley, Warwick (GB); Zhou Xu, Leamington Spa (GB); Ian Barlow, Oxfordshire (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 24 days.

This patent is subject to a terminal disclaimer.

(21) Appl. No.: 15/036,604

(22) PCT Filed: Oct. 29, 2014

(86) PCT No.: PCT/EP2014/073221
§ 371 (c)(1),
(2) Date: May 13, 2016

(87) PCT Pub. No.: WO2015/071101
PCT Pub. Date: May 21, 2015

(65) Prior Publication Data
US 2016/0288645 A1 Oct. 6, 2016

(30) Foreign Application Priority Data
Nov. 15, 2013 (GB) .................................. 1320159.5

(51) Int. Cl.
*G06F 7/00* (2006.01)
*B60K 35/00* (2006.01)
(Continued)

(52) U.S. Cl.
CPC ....... *B60K 35/00* (2013.01); *B60W 30/18009* (2013.01); *B60W 50/14* (2013.01);
(Continued)

(58) Field of Classification Search
USPC .......................................................... 701/36
See application file for complete search history.

(56) References Cited

U.S. PATENT DOCUMENTS

| 8,378,803 B1 | 2/2013 | Keiser | |
| 2015/0066339 A1* | 3/2015 | Hoare | B60G 17/019 701/116 |
| 2016/0200196 A1* | 7/2016 | Michaelides | B60L 3/0046 701/22 |

FOREIGN PATENT DOCUMENTS

| DE | 102009041198 A1 | 4/2011 |
| EP | 2698299 A1 | 2/2014 |

(Continued)

OTHER PUBLICATIONS

Search Report corresponding to application No. GB1320159.5, dated May 29, 2014, 5 pages.
(Continued)

*Primary Examiner* — Tyler Paige
(74) *Attorney, Agent, or Firm* — Reising Ethington P.C.

(57) ABSTRACT

Aspects of the disclosure relate to a method of controlling an HMI-apparatus for providing information to a driver of a vehicle for aiding driver control of a vehicle when the vehicle is wading in a body of water. The method includes determining a measured depth of water about the actual vehicle and determining a display depth, dependent upon the measured depth of water. The method also includes measuring a lateral and/or longitudinal gradient of the actual vehicle and selecting a display vehicle position from a limited number of available options of display vehicle positions based upon the measured lateral and/or longitudi- (Continued)

nal gradient of the actual vehicle. In this way the HMI-apparatus can output a simplified picture of the actual vehicle scenario which may be easier for the driver to assimilate.

28 Claims, 12 Drawing Sheets

(51) Int. Cl.
*B60W 50/14* (2012.01)
*B60W 30/18* (2012.01)

(52) U.S. Cl.
CPC *B60K 2350/1076* (2013.01); *B60K 2350/352* (2013.01); *B60W 2050/146* (2013.01); *B60W 2520/10* (2013.01); *B60W 2520/16* (2013.01); *B60W 2520/18* (2013.01)

(56) References Cited

FOREIGN PATENT DOCUMENTS

| | | | |
|---|---|---|---|
| GB | 2376929 A | * 12/2002 | ......... B60G 17/0165 |
| GB | 2496051 A | 5/2013 | |
| GB | 2499419 A | 8/2013 | |
| WO | WO2012080435 A1 | 6/2012 | |
| WO | WO2012080437 A1 | 6/2012 | |
| WO | WO2012080438 A1 | 6/2012 | |
| WO | WO2012123555 A1 | 9/2012 | |
| WO | WO2013144252 A1 | 10/2013 | |

OTHER PUBLICATIONS

International Search Report corresponding to International application No. PCT/EP2014/073221, dated Feb. 13, 2015, 7 pages.
Written Opinion corresponding to International application No. PCT/EP2014/073221, dated Feb. 13, 2015, 7 pages.

* cited by examiner

VEHICLE HAVING WADE SENSING DISPLAY AND SYSTEM THEREFOR

FIELD OF THE INVENTION

The present invention relates to a method, to a system, to a vehicle and to a program, of controlling an HMI-apparatus used in a vehicle to provide information about the level of water relative to the exterior of the vehicle when wading.

Aspects of the invention relate to a method, to a system, to a vehicle and to a program.

BACKGROUND

When vehicles drive through a body of water that is more significant in depth than a puddle, it is often referred to as a wading event. Driver caution and judgement is required when navigating a vehicle through a body of water at wading depth, i.e. at a water depth above a threshold wading depth at which the vehicle can be considered to be wading. This is because a vehicle driver does not generally know the depth of water the vehicle is about to enter or the nature of the terrain below the water surface. This is particularly so in low visibility conditions (dirty water, low-light, heavy rain, fog). It is recommended that a survey of the terrain is taken by wading through water on foot, but factors such as the variability of the terrain; low visibility conditions; inconvenience to the driver; and driver impatience may result in a driver attempting to traverse water without knowledge of the water depth and therefore without being able to take appropriate precautions.

In development of vehicle systems intended to aid a driver's control of a vehicle when wading through water, the present applicant has submitted a series of patent applications relating to the detection of a body of water using one or more sensors mounted externally on the vehicle. For example, in WO 2012/123555 a vehicle having a system comprising two ultrasonic transducer sensors, disposed on the left-side and right-side mirrors of the vehicle, operable in conjunction with an under-body mounted contact water sensor, is disclosed.

The present applicant has also submitted patent applications relating to the use of an in-vehicle cabin display screen for providing information to the driver of the vehicle. For example, in WO/2012/080435, WO/2012/080437 and WO/2012/080438 each to the present applicant, vehicles having display systems are disclosed in which an elevation of a vehicle is shown along with a current water level. Data relating to a maximum wading depth and to an advisory vehicle speed is also disclosed.

It can be appreciated that the more data that is gathered regarding the detection of water and measurements relating to its depth relative to the vehicle, the more accurate a system for aiding wading may be. However, such data needs to be processed and analyzed in real-time and in such a way that a display screen can be populated such that it provides useful information in a clear and easily understood manner. The provision of too much data or data that changes too rapidly may be difficult to understand and may in fact present a distraction rather than an aid.

It has been disclosed in WO/2012/080435, WO/2012/080437 and WO/2012/080438 to illustrate a detected water level by showing a straight line on an elevation of a display vehicle. Whilst a straight line representing a water level is a simple graphic which is easy for the driver to review and from which the necessary information can be easily assimilated, the determination of where to place such a line is not straightforward. This is especially so given the fact that the actual water being detected does not adopt a perfectly flat, smooth surface and is especially so when data from multiple sources regarding water level is obtained at different points across a moving, rippled and non-flat water surface.

The present invention in at least some embodiments seeks to provide a further improvement in systems for land-based vehicles for aiding driver control of those vehicles when wading.

SUMMARY

Aspects of the invention relate to a method, to a system, to a vehicle and to a program as claimed in the appended claims.

According to an aspect of the disclosure for which protection is sought, there is provided a method of controlling an HMI-apparatus to provide information to a driver of a vehicle to aid driver control of a vehicle when the vehicle is wading in a body of water, the method comprising:
(i) determining, in dependence upon a sensed depth of water surrounding the vehicle, a display depth;
(ii) determining one or more of:
  a measured longitudinal gradient of the vehicle and in dependence thereupon determining a display longitudinal gradient for a display vehicle illustrated on a HMI display of the HMI-apparatus, wherein determining the display longitudinal gradient comprises determining in which one of a plurality of prescribed display ranges the measured longitudinal gradient falls, and in response thereto selecting a single predetermined display longitudinal gradient corresponding to the determined prescribed range; and
  a measured lateral gradient of the vehicle and in dependence thereupon determining a display lateral gradient for a display vehicle illustrated on a display by the HMI-apparatus, wherein determining the display lateral gradient comprises determining in which one of a plurality of prescribed display ranges the measured lateral gradient falls and in response thereto selecting a single predetermined display lateral gradient corresponding to the determined prescribed range.

Optionally, the method further comprises displaying on an HMI display a display vehicle side elevation in one of the following positions relative to a notional horizontal axis of said display:
  a first nose up position;
  a first nose down position; or
  a longitudinally level position,
in dependence upon the selected single predetermined display longitudinal gradient.

The method may comprise displaying one of:
  a side elevation of the display vehicle in the first nose up position if the measured longitudinal gradient is greater than a first longitudinal angle threshold; and if the measured longitudinal gradient is less than a second longitudinal angle threshold;
  a side elevation of the display vehicle in the first nose down position if the measured longitudinal gradient is less than a third longitudinal angle threshold and if the measured longitudinal gradient is greater than a fourth longitudinal angle threshold; and
  a side elevation of the display vehicle on an active display in the longitudinally level position if the measured longitudinal gradient is less than or equal to the first longitudinal angle threshold and if the measured longitudinal gradient is greater than or equal to the third longitudinal angle threshold.

In one embodiment the method comprises displaying a side elevation of the display vehicle on a holding display if the measured longitudinal gradient is less than the fourth longitudinal angle threshold; or if the measured longitudinal gradient is greater than the second longitudinal angle threshold.

In another embodiment the method may comprise displaying one of: a side elevation of the display vehicle in a second nose up position if the measured longitudinal gradient is greater than or equal to the second longitudinal angle threshold and if the measured longitudinal gradient is less than a fifth longitudinal angle threshold; and a side elevation of the display vehicle in a second nose down position if the measured longitudinal gradient is less than or equal to a fourth longitudinal angle threshold and if the measured longitudinal gradient is greater than a sixth longitudinal angle threshold. Optionally, the method comprises displaying a side elevation of the display vehicle on a holding display if the measured longitudinal gradient is less than the sixth longitudinal angle threshold, or if the measured longitudinal gradient is greater than the fifth longitudinal angle threshold.

Optionally, the first longitudinal angle threshold is 4°; and/or the second longitudinal angle threshold is 10°; and/or the third longitudinal angle threshold is −4° (minus four degrees); and/or the fourth longitudinal angle threshold is −10° (minus ten degrees).

Optionally, the method comprises determining a measured lateral gradient of the vehicle and displaying a side elevation of the display vehicle on a holding display if the measured lateral gradient exceeds one of a positive and a negative predetermined lateral gradient threshold.

Optionally, the method comprises displaying at least one of a display vehicle front elevation and a display vehicle rear elevation on the HMI display in one of the following positions to a notional horizontal axis of the display:
 a first right-hand side low position;
 a first left-hand side low position; or
 a laterally level position,
in dependence upon the selected predetermined display lateral gradient.

Optionally, the method comprises displaying one of:
 the at least one of a front and a rear display vehicle elevation of the in the first right-hand side low position if the measured lateral gradient is greater than a first lateral angle threshold and if the measured lateral gradient is less than a second lateral angle threshold;
 the at least one of a front and a rear display vehicle elevation of the in the first left-hand side low position if the measured lateral gradient is less than a third lateral angle threshold and if the measured lateral gradient is greater than a fourth lateral angle threshold; and
 the at least one of a front and a rear display vehicle elevation of the on an active display in the laterally level position if the measured lateral gradient is less than or equal to the first lateral angle threshold and if the measured lateral gradient is greater than or equal to the third lateral angle threshold.

Optionally, the method comprises:
 displaying the at least one of a front and a rear elevation of the display vehicle in a second right-hand side low position if the measured lateral gradient is greater than or equal to the second lateral angle threshold and if the measured lateral gradient is less than a fifth lateral angle threshold;
 displaying the at least one of a front and a rear elevation of the display vehicle in a second left-hand side low position if the measured lateral gradient is less than or equal to a fourth lateral angle threshold and if the measured lateral gradient is greater than a sixth lateral angle threshold.

Optionally, the first lateral angle threshold is 5°; and/or the second lateral angle threshold is 10°; and/or the third lateral angle threshold is −5° (minus five degrees); and/or the fourth lateral angle threshold is −10° (minus ten degrees).

Optionally, the method comprises determining a speed of the vehicle and displaying a side elevation of the display vehicle on a holding display if the measured longitudinal gradient exceeds a speed dependant longitudinal gradient threshold.

Optionally, the method comprises: superimposing, in dependence on the determined display depth, a display level on the elevation of the display vehicle.

Optionally, the display level is a scaled and linear extrapolation of the display depth and is positioned parallel to a notional horizontal axis of the display.

Optionally, the method comprises visually contrasting the holding display from the active display, for example by the display vehicle having a greater fading or being more transparent in the holding display than in the active display.

Optionally, the method comprises, in dependence upon one or more vehicle parameters, including the measured lateral gradient and/or the measured longitudinal gradient:
 (a) populating the HMI-apparatus with an active display comprising an illustration of the display depth; or
 (b) populating an HMI-apparatus with a holding display; or
 (c) populating the HMI-apparatus with a failure display.

Optionally, the one or more vehicle parameters includes vehicle speed and/or vehicle direction and/or water temperature.

Optionally no display level is superimposed upon the display vehicle in the holding display.

Optionally, the failure display comprises a textual warning for conveying to the driver that the HMI apparatus is not functioning properly.

According to another aspect of the disclosure for which protection is sought, there is provided a system configured and arranged for carrying out the method of any of the preceding claims, the system comprising:
 a measurement apparatus comprising at least one sensor for measuring a depth of water; and
 a display system comprising an HMI-apparatus; and
 a processor coupled to the HMI-apparatus and coupled to the measurement apparatus wherein the processor is configured to perform the method according to any one of the preceding claims.

Optionally, in determining a display depth the processor compensates for at least one of a currently selected vehicle ride height and a vehicle speed.

According to yet another aspect of the disclosure for which protection is sought, there is provided a vehicle comprising a system according to the relevant preceding paragraphs.

Optionally, the measurement apparatus of the vehicle comprises at least two remote water surface detection sensors: a first sensor disposed on one side of the vehicle; and a second sensor disposed on the other side of the vehicle, the first and second sensors providing over time, to the processor: a first data signal indicative of a first depth of the water on one side of the vehicle; and a second data signal indicative of a second measured depth of water on the other side of the vehicle.

Optionally, the first and second sensors are mounted to a left side mirror and right side mirror of the vehicle respectively and are each ultrasonic transducer sensors.

According to an even further aspect of the disclosure for which protection is sought, there is provided a program for a processor for use in a system according the relevant preceding paragraphs for aiding driver control of the vehicle when the vehicle is wading, the program configured and arranged such that when running on the processor, the processor is configured to perform the method of any one of the relevant preceding paragraphs.

An off-road vehicle may be defined as a road vehicle having some off-road capability—such as the provision of all wheel drive. Whereas at least one embodiment of the present invention provides particular benefit for off-road vehicles which may travel through bodies of water at wading depth more frequently than road-vehicles, it will be appreciated that one or more embodiments of the present invention may be applicable and useful in other types of road vehicle as well.

As used herein, the term "HMI-apparatus" refers to all manner of suitable devices that facilitate communication between the vehicle systems and a driver of the vehicle including Front Control Display Interface Modules (FCDIM). "HMI apparatus" may refer to a single device or more than one device. In the context of this disclosure the "HMI-apparatus" refers to a device that communicates visually, and optionally also audibly, or which may produce a haptic warning or any combination thereof. Visual communications optionally may include: illuminating one or more warning lights, providing symbols, pictures, graphics and/or text which, for example, may be presented on any one or more or a combination of: a dashboard control panel; a display screen; and a heads-up display. Representations provided on display screens may be 2-D representations or 3-D representations. Visual communications may be in grey-scale or color format. Audible communications optionally may include: warning beeps, alarms and voice-overs and may be output through any one or more or a combination of: any in-cabin speaker (including a driver-side ear-level speaker for communications directed at the driver only); head phones (optionally wireless) or ear-piece (optionally wireless). It will be recognized that with advances in technology, various communication devices may become available that are suitable as an HMI-apparatus.

By "elevation" herein is meant, without limitation, an image, picture or other illustrative and visual representation. Optionally "elevation" refers to a two-dimensional view.

In this specification, the term "wading" relates to travel of a land-based vehicle through water of a depth that is sufficient to require that the vehicle driver take appropriate precautions. To distinguish a wading event from a vehicle driving through a shallow puddle, in some situations wading depth may be defined as water of 200 mm or more in depth. In some situations water at a level of the front or rear wheel hubs may be indicative of a vehicle in water at wading depth. In some situations wading depth may be defined as the point at which a water contact sensor is immersed in water. However, the depth at which it is determined that a vehicle is wading (sometimes referred to as a threshold wading depth) may be determined by the vehicle design and it is therefore not possible to define a threshold wading depth that is appropriate for all vehicles. Similarly, the permissible maximum wading depth of a vehicle is determined by the vehicle design. In some vehicles the position of an engine air intake may limit the maximum depth of water the vehicle can wade in. In some vehicles the maximum wading depth may be variable due to the provision of a deployable snorkel and/or adjustable ride height for example.

Throughout the specification reference is made to the term "water". It will be understood that in the context of a land-based vehicle driving through water, the term "water" is intended to encompass all liquid media that a land-based vehicle may drive through and is not limited in its interpretation to pure $H_2O$. For example, as used herein, the terms "water" and "body of water" may mean, but are not limited to: a muddy river bed; seawater; a ford; and dirty water in off-road terrain.

The methods, algorithms and control processes described herein can be machine-implemented. The methods, algorithms and control processes described herein can be implemented on one or more computational device(s) comprising one or more processors, for example, an electronic microprocessor. Such processor(s) may be configured to perform computational instructions stored in memory or in a storage device accessible by the processor(s).

Within the scope of this application it is envisaged that the various aspects, embodiments, examples and alternatives, and in particular the features thereof, set out in the preceding paragraphs, in the claims and/or in the following description and drawings, may be taken independently or in any combination thereof. For example, features described in connection with one embodiment are applicable to all embodiments, unless such features are incompatible.

BRIEF DESCRIPTION OF THE DRAWINGS

Embodiments of the present invention will now be described, by way of example only, with reference to the accompanying Figures in which.

DETAILED DESCRIPTION

Figure 1:
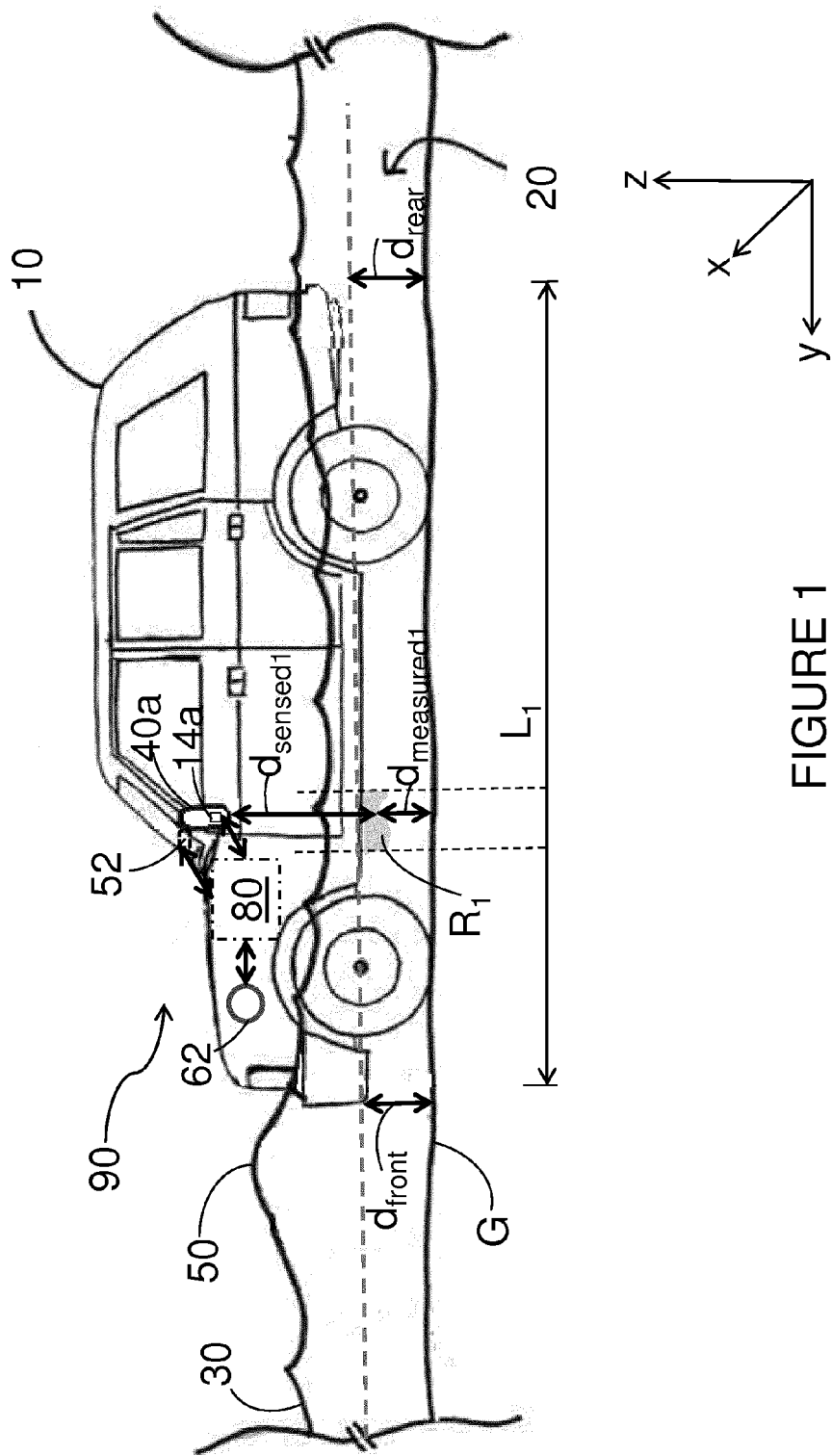
FIG. 1 is a side view of an actual vehicle in a wading scenario, having a system comprising sensors for the detection of a water surface and having an HMI-apparatus according to an embodiment of the disclosure.
Figure 1B:
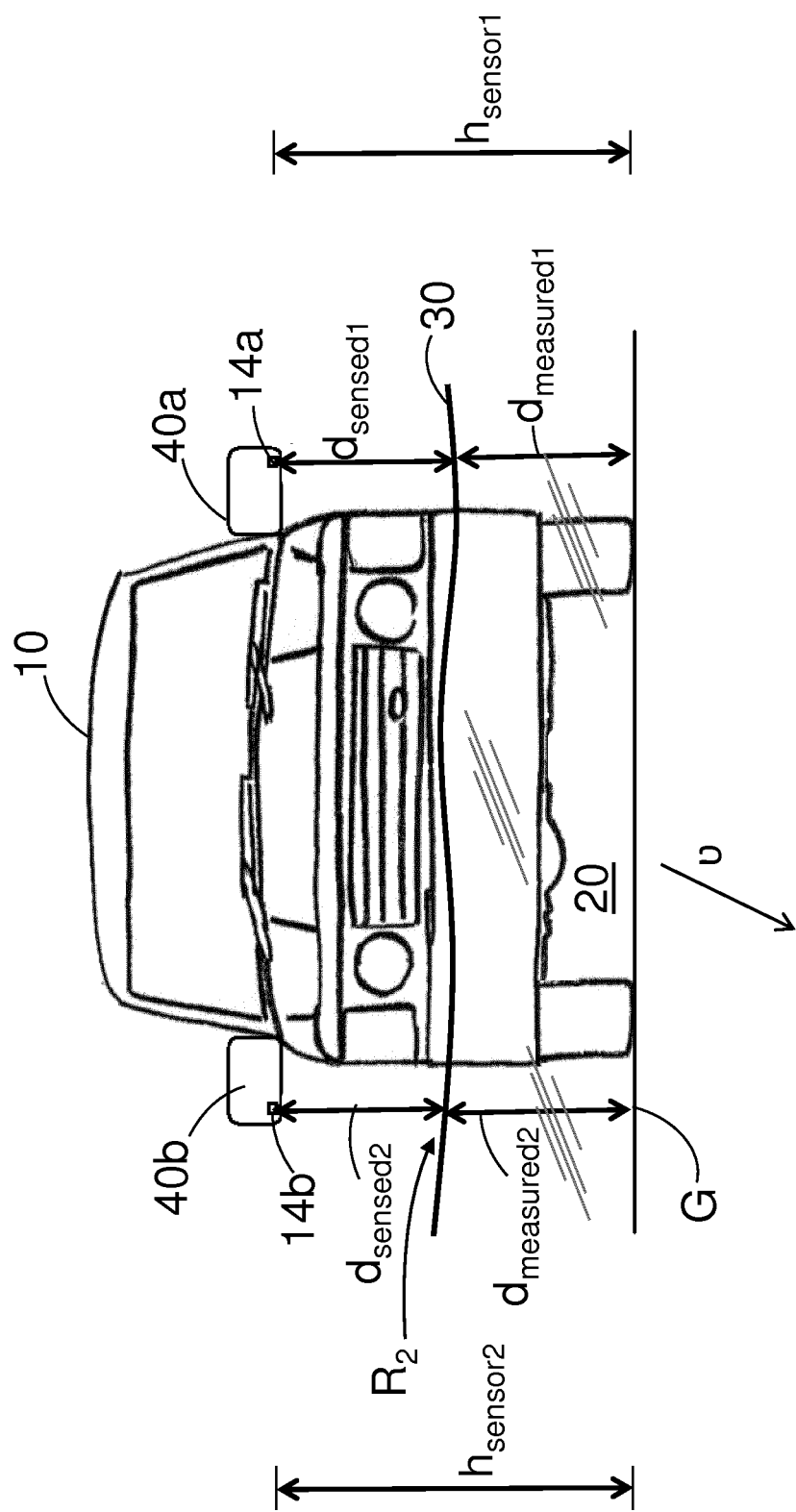
FIG. 1B is a front view of the actual vehicle of FIG. 1 in a wading scenario. Only part of the system comprising sensors for the detection of a water surface and having an HMI-apparatus according to an embodiment of the disclosure is shown.

Generally, aspects and embodiments of the present invention relate to a method of controlling an HMI-apparatus for providing information to a driver of a vehicle for aiding driver control of the vehicle when the vehicle is wading in a body of water. In FIGS. 1 and 1B, there is shown a vehicle 10 having a system 90 comprising one or more water level detection sensors 14a, 14b and having a control unit 80 configured to analyze measurement data gathered from the one or more water level detection sensors 14a, 14b and configured to interpret the data. The analysis and interpretation of the data may be conducted using one or more or a series of algorithms, optionally arranged on one or more programs executable by the control unit 80. In the presently illustrated embodiment, the analysis and interpretation is conducted specifically to determine with what information an in-cabin HMI apparatus 52 should be populated, in order to convey information, and optionally advice, to a driver of the vehicle 10.

Referring to the embodiment illustrated in FIGS. 1 and 1B, the vehicle 10 has a length $L_1$ and the system 90 comprises a measurement apparatus for measuring a depth of water or the level of water relative to the vehicle 10 comprising at least one remote water level detection sensor 14a, 14b coupled to the control unit 80. The system 90 also comprises a vehicle attitude measurement apparatus 62 coupled to the control unit 80. In this embodiment, the vehicle attitude measurement apparatus 62 is an inertial measurement unit (IMU) comprising accelerometers and/or gyroscopes appropriately oriented and configured to at least determine a longitudinal gradient (in the y-direction) of the vehicle 10 relative to a horizontal; and to determine a lateral gradient (in the x-direction) of the vehicle 10 relative to a horizontal. The HMI-apparatus 52 comprises a display screen and optionally an audible output. The HMI-apparatus 52 is coupled to the control unit 80.

The measurement apparatus for measuring a depth of water or the relative level of water to the vehicle 10 in this embodiment includes two sensors: a first ultrasonic transducer sensor 14a mounted to a left-side mirror 40a of the vehicle 10; and a second ultrasonic transducer sensor 14b mounted to a right-side mirror 40b (see FIG. 1B) of the vehicle 10. The first ultrasonic transducer sensor 14a is configured to emit and receive a pulsed ultrasonic signal. The time of receipt of an echoed ultrasonic signal may be indicative of a distance $d_{sensed1}$, between the first ultrasonic transducer sensor 14a and the surface 30 of a body of water 20 in a first measurement region $R_1$ adjacent to the vehicle 10. The first measurement region $R_1$ is approximately at the same longitudinal axis (y-axis as illustrated in FIG. 1) along the vehicle 10 as the first ultrasonic transducer sensor 14a. However, it will be appreciated that, in dependence upon the angle(s) of incidence of a signal(s) emitted by the first sensor 14a, water depth may be measured within a region $R_1$. The second ultrasonic transducer sensor 14b operates in a similar manner and the time of receipt of an echoed ultrasonic signal may be indicative of a distance $d_{sensed2}$, between the second ultrasonic transducer sensor 14b and the surface 30 of a body of water 20 in a second measurement region $R_2$ adjacent to the vehicle 10 on the opposite, right-side of the vehicle 10.

Further optionally, the first and second ultrasonic transducer sensors 14a, 14b are positioned on the vehicle 10 on the same lateral axis (x-axis) thereof. The mounting height $h_{sensor1}$, $h_{sensor2}$ of each of the first and second ultrasonic transducer sensors 14a, 14b is known and in the vehicle 10 an adjustable suspension system (not shown) permits the adjustment of the ride height (RH) of the vehicle 10. The control unit 80 is provided with the current vehicle ride height (RH) of the vehicle 10 and therefore, in conjunction with the mounting height $h_{sensor1}$, $h_{sensor2}$ (see FIG. 1B) of the first and second sensors 14a, 14b and the distances $d_{sensed1}$, $d_{sensed2}$ between the first and second ultrasonic transducer sensors 14a, 14b and the surface 30 of the body of water 20, the control unit 80 of the system 90 is configured to determine a first measured depth $d_{measured1}$ substantially beneath the first sensor 14a (in other words, in the region $R_1$); and a second measured depth of water $d_{measured2}$ substantially beneath the second sensor 14b.

In an embodiment, the HMI apparatus 52 comprises a display screen which can be populated with still and moving images, graphics and text, in grey scale and color (herein referred to as a display 95, 95a, 95b, 95c, 95d, 95e, 97a, 97b, 97c, 97d; 195a, 195b, 195c, 197). The HMI apparatus 52 is coupled to the control unit 80 by a wired connection. In other arrangements the HMI apparatus 52 is wirelessly coupled to the control unit 80. The HMI apparatus 52 may be utilized for the control and or display of other vehicle systems. Therefore, when the HMI apparatus 52 is being used to assist a driver during wading it is desirable to show a clear indication on the HMI apparatus 52 that the HMI apparatus 52 is deployed and activated for that purpose. Examples of graphics, images 110, 210 and text and a water depth guide 17, 117 that may be shown on an "active display" 95, 95a, 95b, 95c, 95d, 95e; 195a, 195b, 195c of the HMI apparatus 52 during a wade assist sequence are shown in FIGS. 2, 3, 4, 7, 9 and 10 respectively.

In certain circumstances and embodiments, the present invention beneficially provides for a water depth guide not to be provided in order to avoid providing information to the driver that may not be portrayed accurately and/or that may be considered as not entirely accurate of the full wading scenario the vehicle 10 is in. In such scenarios, which are explained in detail below, the control unit 80 is configured to cause the HMI apparatus 52 to adopt a "holding display" 97a, 97b, 197. Examples of graphics, images 110, 210 and text 120, 120b that may be shown on a holding display 97a, 97b, 97c, 97d; 197 of the HMI apparatus 52 during a wade assist sequence are shown in FIGS. 4, 5, 6, 6A, 6B and FIG. 10 respectively. The provision of a holding display 97a, 97b, 97c, 97d, 197 beneficially enables the system 90 to not present a water level guide; to optionally state the reason why; and at all times to convey to the driver that not presenting a water level guide is deliberate and that the system 90 remains active and functional.

In at least some embodiments, the system 90 is configured to provide information to the driver in a simple format in consideration of the orientation of the vehicle 10. To provide a useful guide for a driver of the vehicle 10 it is preferred, but nevertheless optional, that the system 90 provides a two-dimensional illustration of an elevation of the side of a display vehicle 110, on a display 95a, 95b, 95c, 95d, 95e of the HMI-apparatus 52. Alternatively or additionally a front and/or rear view of a display vehicle 210 may be shown on an active display 195a, 195b, 195c, optionally in addition to a side view.

To provide a clear guide for the driver of the vehicle 10 it is preferred in at least some embodiments that active displays 95a, 95b, 95c, 95d, 95e 195a, 195b, 195c on the HMI-apparatus 52 do not flicker and do not change too rapidly. In particular, in at least some embodiments, the position of the display vehicle 110, 210 does not change and flicker in proportion to every slight detected change in the vehicle's 10 orientation. Especially on rough terrain, such as off-road, changes in the actual orientation (in terms of pitch and roll) of a vehicle 10 can be detected almost continually. Beneficially therefore the system 90 of the present disclosure in at least some embodiments is configured to display key metrics on the HMI-apparatus 52 using a selected and limited number of illustrations. The system 90 and the HMI-apparatus 52 therein does not simply output or display the raw data obtained by the measurement apparatus 14a, 14b and the vehicle attitude measurement apparatus 62, but rather in dependence upon the data gathered from the water measurement apparatus 14a, 14b and the vehicle attitude measurement apparatus 62, the control unit 80 of the system determines a combination of graphics that should be displayed in order to convey to the driver information about the scenario the vehicle 10 is currently in, using a clear and easily understood display 95a, 95b, 95c, 95d, 95e 195a, 195b, 195c. This is done in certain embodiments by selecting a position of a display vehicle 110, 210 from a limited number of options and superimposing thereon a water level 17, 117. In some embodiments, the position of the water level 17, 117 is selected from a limited number of discrete positions.

In a first illustrated embodiment of the method of controlling the HMI-apparatus 52, when the actual vehicle 10 is disposed on a surface G at a shallow longitudinal incline (see FIG. 2), the attitude measurement apparatus 62 substantially continually determines a measured longitudinal gradient $\theta_{long}$ of the vehicle 10. When the nose (the front end) of the vehicle 10 is pointed downward, the vehicle position is referred to as a "nose-down" position. In the scenario depicted in FIG. 2, the measured longitudinal gradient $\theta_{long}$ is about −3.5° (minus three point five degrees). Other values for $\theta_{long}$ may be useful.

Figure 3:
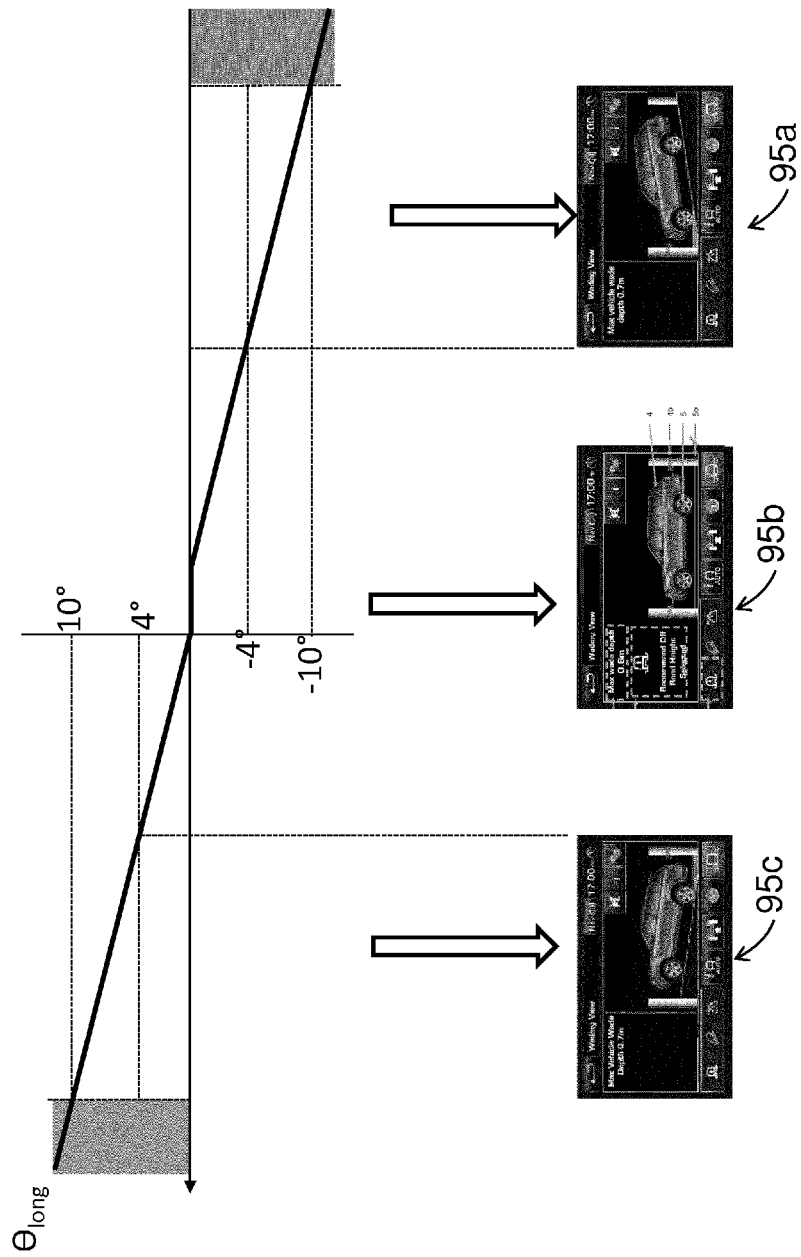
FIG. 3 is a graphical representation of a range of measured actual vehicle longitudinal gradients and corresponding illustrations that are displayed on the in-vehicle cabin HMI-apparatus at those measured actual vehicle longitudinal gradients, showing a side elevation of a display vehicle in a nose up position; a longitudinally level position; and a nose down position respectively (all relative to a notional horizontal axis of said display), according to an embodiment of the disclosure.
Figure 4:
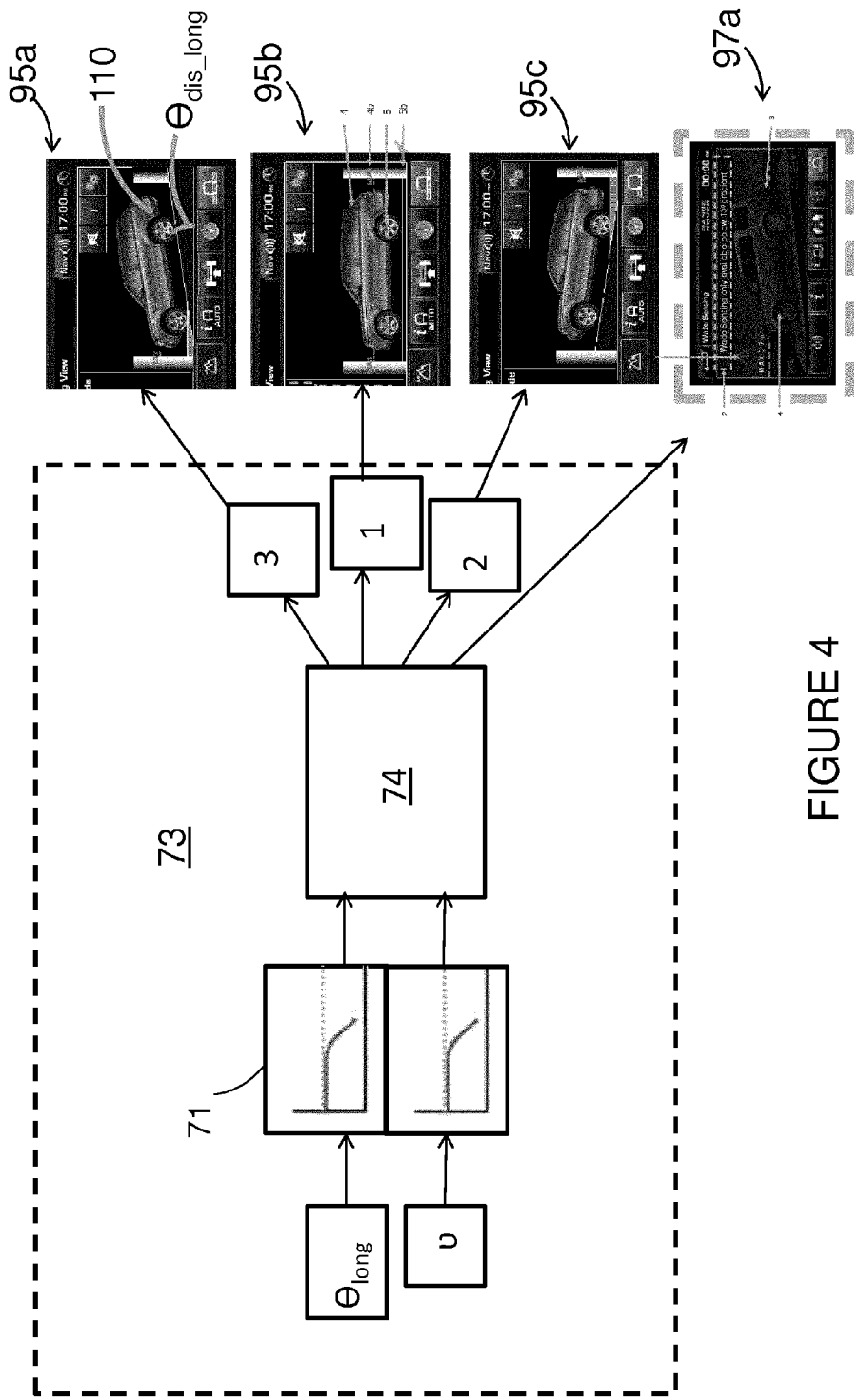
FIG. 4 is a schematic illustration of a first algorithm conducted by a program when running on a processor of the system illustrated in FIG. 1 according to an embodiment of the disclosure.

Upon receipt of the measured longitudinal gradient $\theta_{long}$ data signal from the attitude measurement apparatus 62, the control unit 80 is configured to determine in which position, selected from a limited range of positions, a side elevation of the display vehicle 110 will be shown. In the present embodiment, the control unit 80 categorizes a current value of measured longitudinal gradient $\theta_{long}$ of the vehicle 10. For example and as depicted in FIGS. 3 and 4, a measured longitudinal gradient $\theta_{long}$ is categorized or labelled using an identifier value "1", "2" or "3". The identifier values "1", "2", and "3" represent or correspond to:

1: a display vehicle 110 in a longitudinally level position relative to a notional horizontal 'H' axis of said display 95 (see FIG. 2);
2: a display vehicle 110 in a nose up position relative to a notional horizontal axis of said display 95c (see FIG. 3); and
3: a display vehicle 110 in a nose down position relative to a notional horizontal axis of said display 95a (see FIG. 3).

The actual longitudinal display angle of the display vehicle 110 in the three positions corresponding to the values "1", "2", and "3" of a first series of selectable values may optionally be about 10°, zero and about −10° respectively. Other angular values for 2 and 3 may be useful.

It will be understood from reading the foregoing that a negative longitudinal gradient refers to a longitudinal gradient when the vehicle 10 or display vehicle 110 is in a nose-down position, whereas a positive longitudinal gradient refers to a longitudinal gradient when the vehicle 10 or display vehicle 110 is in a nose-up position.

The identifier values "1", "2", and "3" represent a first series of positions of the display vehicle 110. The first series comprises three positions. It will be understood that a range of three selectable positions for the display vehicle 110 is optional. For example, in other embodiments, more than three selectable positions for the display vehicle 110 are provided. For example, five selectable positions for the display vehicle may be available (see below). However, the total number of selectable positions for the display vehicle 110 is far fewer than the range of water depth or water level measurements of the measuring apparatus 14a, 14b and the frequency with which such measurements are taken (sampling rate) by the measuring apparatus 14a, 14b. As such, the measured longitudinal gradient value $\theta_{long}$ comprises a value from a second range of values that comprises a significantly greater number of possible values than said first series of values (which represent selectable positions of display vehicle 110). For example, in the present arrangement, the longitudinal gradient $\theta_{long}$ is measurable between about −45° and about 45° by an analog accelerometer or a gradient sensor which may comprise two or more orthogonally arranged accelerometers. In other embodiments, an analog to digital converter is coupled to the analog accelerometer and the measured longitudinal gradient $\theta_{long}$ data signal is a digital signal. Nevertheless, the digital signal may still comprise a significantly greater number of values than said first series of values. By categorizing the large range of measured values of $\theta_{long}$ into far fewer discrete categories or values, a graphical display 95a, 95b, 95c, 95d, 95e is produced by the present method that is far simpler to digest than a graphical display depicting the actual and often rapidly changing values contained in the measured longitudinal gradient $\theta_{long}$ data signal.

In FIG. 4, there is provided an illustration of an embodiment of an algorithm 73 used by the control unit 80 for categorizing or otherwise converting the measured longitudinal gradient $\theta_{long}$ data signal into an identifier value ("1", "2", or "3") which represents a position of a display vehicle

110 at a specific (and pre-determined) display longitudinal gradient $\theta_{dis\_long}$ (see display 95a of FIG. 4). It can be seen that the measured longitudinal gradient $\theta_{long}$ data signal is input into filtering block 71, wherein the data signal is mathematically low-pass filtered. Before or after (preferably after) filtering, the measured longitudinal gradient data signal may be averaged in sample periods in order to derive an average measured longitudinal gradient $\theta_{long}$ for each sample period (not shown in FIG. 4).

Then, at processing block 74, based upon each manipulated (filtered, sampled and averaged) value from the measured longitudinal gradient $\theta_{long}$ data signal, an identifier value ("1", "2", or "3") corresponding to a position of a display vehicle 110 at a display longitudinal gradient $\theta_{dis\_long}$, is derived from the following equations:

$$T_{TLA} \leq \theta_{long} \leq T_{FLA}, \quad (1)$$

$$T_{FLA} < \theta_{long} < T_{SLA}, \quad (2)$$

$$T_{FOLA} < \theta_{long} < T_{TLA}, \quad (3)$$

wherein $T_{FLA}$ is a first longitudinal angle threshold, which optionally is about 4°; wherein $T_{SLA}$ is a second longitudinal angle threshold, which is optionally about 10°; wherein $T_{TLA}$ is a third longitudinal angle threshold, which is optionally about −4° (minus four degrees); and wherein $T_{FOLA}$ is a fourth longitudinal angle threshold, which is optionally about −10° (minus ten degrees).

If the measured longitudinal gradient $\theta_{long}$ satisfies equation (1) above, then the identifier value is "1", which corresponds to showing the display vehicle 110 in a longitudinally level position (having a display longitudinal gradient $\theta_{dis\_long}$ of zero) as shown in active display 95b of FIGS. 3 and 4.

If the measured longitudinal gradient $\theta_{long}$ satisfies equation (2) above, then the identifier value is "2", which corresponds to showing the display vehicle in a nose-up position (having a display longitudinal gradient $\theta_{dis\_long}$ of about 10°) as shown in active display 95c of FIGS. 3 and 4.

If the measured longitudinal gradient $\theta_{long}$ satisfies equation (3) above, then the identifier value is "3", which corresponds to showing the display vehicle in a nose-down position (having a display longitudinal gradient $\theta_{dis\_long}$ of about −10°) as shown in active display 95a of FIGS. 3 and 4.

In words, the above equations and consequences may be written out as:
(1) Display a side elevation of the display vehicle 110 on an active display 95b in the longitudinally level position ($\theta_{dis\_long}$=zero):
   (a) if the measured longitudinal gradient $\theta_{long}$ is less than or equal to the first longitudinal angle threshold $T_{FLA}$; and
   (b) if the measured longitudinal gradient $\theta_{long}$ is greater than or equal to the third longitudinal angle threshold $T_{TLA}$.
(2) Display a side elevation of the display vehicle 110 on an active display 95c in the nose up position ($\theta_{dis\_long}$=+10°):
   (a) if the measured longitudinal gradient $\theta_{long}$ greater than the first longitudinal angle threshold $T_{FLA}$; and
   (b) if the measured longitudinal gradient $\theta_{long}$ less than the second longitudinal angle is threshold $T_{SLA}$.
(3) Display a side elevation of the display vehicle 110 on an active display 95a in the nose down position ($\theta_{dis\_long}$=−10°):
   (a) if the measured longitudinal gradient $\theta_{long}$ is less than the third longitudinal angle threshold $T_{TLA}$; and
   (b) if the measured longitudinal gradient $\theta_{long}$ is greater than the fourth longitudinal angle $T_{FOLA}$.

In the present embodiment, the display vehicle 110 is only shown in the positions identified by values "1", "2" and "3" on an active display 95a, 95b, 95c, 95d. In this way the display graphics of the HMI apparatus 52 are simplified compared to the true measured vehicle 10 longitudinal gradient $\theta_{long}$. In most instances, therefore, the true measured vehicle 10 longitudinal gradient $\theta_{long}$ is not shown. In fact at times the display vehicle 110 is shown as level when the actual vehicle 10 is on a shallow incline (as is the case in FIG. 2), and at times the display vehicle 110 is shown on a 10° incline when the true actual incline is, for example, only 5°. However the information communicated to the driver is sufficiently accurate to convey to the driver a water level guide relative to the vehicle 10 (or absolute water depth guide) and whether the vehicle 10 is substantially inclined or not.

The "simplified" approach beneficially presented by at least some embodiments of the system 90 of the present disclosure avoids a display graphic that changes so rapidly in response to changing vehicle 10 conditions that information cannot be assimilated or understood sufficiently easily. On bumpy and uneven terrains, illustrating every minor variation in terrain could generate a display changing very rapidly. Braking of the vehicle 10 or acceleration of the vehicle 10, may give rise to a change in vehicle longitudinal gradient and showing such changes as changes in ground elevation is also disadvantageous. It is therefore beneficial in at least some embodiments that the system 90 only shows larger, more substantial changes in terrain gradient and has a steady display by utilizing a limited number of fixed positions for the display vehicle 110.

Furthermore, in at least some embodiments, the system 90 is beneficial in that a change from a currently displayed position of the display vehicle 110 to a new position of the display vehicle 110 is only permitted if certain boundary conditions are met. In the situation where an active display 95, 95a, 95b, 95c shows a display vehicle 110 in a current position, optionally identified by either a "1" (longitudinally level position), "2" (nose up position), or a "3" (nose down position), that current position shall not change to a new position of the display vehicle 110 until the detected measured longitudinal gradient $\theta_{long}$ continuously returns the identifier value corresponding to the new position for a pre-specified period of time. In other words, the new position identifier must be true for a set time period before the display vehicle 110 is shown in that new position. Optionally, in one embodiment, the predetermined period is 0.7 s. In at least some embodiments, the predetermined period is calibrateable and optionally may be selected between 0.1 s and 3 s. In this way flicker of an active display 95, 95a, 95b, 95c, 95d, 95e, in which the display changes rapidly between positions, can be avoided or at least minimized (depending upon the specified time period). Since it is desirable to balance the provision of an accurate display with the requirement to avoid a rapidly updating display, a predetermined period of about 0.7 s may be optimal.

In an alternative arrangement, flicker may be reduced by logging consecutive value readings of the detected measured longitudinal gradient $\theta_{long}$. Only if the detected measured longitudinal gradient $\theta_{long}$ corresponding to the new position is logged for a predetermined consecutive number of logged counts or samples will the system 90 cause the active display to show the display vehicle 110 in the new position. It will be appreciated that in dependence upon the sampling frequency a counted number of samples will correspond to a certain time period and essentially defining a boundary condition by a requirement for certain criteria to be met for a specified time period is equivalent to defining a boundary condition by a requirement for certain criteria to be met for a continuous number of consecutive samples.

Optionally, the first and third longitudinal gradient thresholds $T_{FLA}$ and $T_{TLA}$ are about 4° and −4° respectively; and the second and fourth longitudinal gradient thresholds $T_{SLA}$ and $T_{FOLA}$ are about 10° and −10° respectively. However, in other embodiments and in dependence upon vehicle configuration and performance ability, other values for the first and third longitudinal gradient thresholds $T_{FLA}$ and $T_{TLA}$; and second and fourth longitudinal gradient thresholds $T_{SLA}$ and $T_{FOLA}$ are useful.

Optionally, in view of an average of the detected measured longitudinal gradient $\theta_{long}$ being used in the methods of the disclosure, to avoid a time-average data signal being significantly and incorrectly skewed by a spike (or dip) in the detected measured longitudinal gradient $\theta_{long}$, the data signal of the detected measured longitudinal gradient $\theta_{long}$ may be amplitude modified. The data signal of the detected measured longitudinal gradient $\theta_{long}$ may be permitted to have a maximum and/or minimum value that is close to upper and lower longitudinal angle thresholds. For example, the data signal of the detected measured longitudinal gradient $\theta_{long}$ which is input into algorithm 67, may have a maximum value close to the second longitudinal angle threshold $T_{SLA}$ and/or may have a minimum value close to the fourth longitudinal angle threshold $T_{FOLA}$. In arrangements where the second longitudinal angle threshold $T_{SLA}$ is 10° the maximum value the data signal of the detected measured longitudinal gradient $\theta_{long}$ is permitted to have may be about 11°; and similarly, in arrangements where the is fourth longitudinal angle threshold $T_{FOLA}$ is −10° (minus ten degrees), the minimum value the data signal of the detected measured longitudinal gradient $\theta_{long}$ is permitted to have may be about −11° (minus eleven degrees).

Using the method disclosed herein, in at least some embodiments, the display of graphics representing the measured data does not merely smooth out the measured data by averaging over time, but manipulates the measured longitudinal gradient data more intuitively such that a display vehicle 110 is only shown in an inclined position when the actual vehicle 10 is at a substantially inclined position at which the driver should take note. By sharply stepping from a level (zero degree gradient) display vehicle 110 when the actual vehicle 10 is level or only at a shallow incline or decline; to a display vehicle 110 in a clear and prominent nose-up or nose down position (which optionally are illustrated by gradients of about 10°) when the actual vehicle 10 is in a more substantially inclined or declined position, the driver is more likely to note the information being conveyed compared to if the display vehicle's position constantly changed with each bump and dip on an uneven driving surface.

A consequence of displaying the scaled display vehicle 110 on a different (greater or lesser) longitudinal decline or incline is that in at least some embodiments, positioning of the display water level 17 needs to be carefully determined. In another beneficial aspect of at least some embodiments of the methods and systems of the disclosure, the superimposed display water level 17 is positioned on a nose-up or nose-down display vehicle 110 such that it accurately shows the scaled water level relative to the display vehicle in the region R, where the measurement $d_{measured1}$, $d_{measured2}$ was taken. This is irrespective of the angle at which the display vehicle 110 is positioned.

Figure 8:
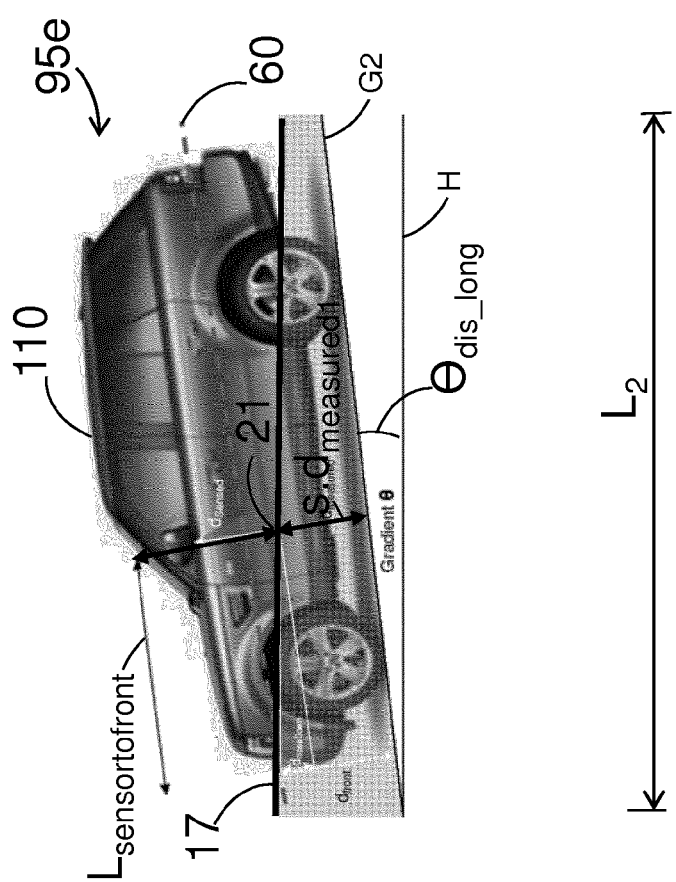
FIG. 8 is an annotated active display that is shown on a display screen of an HMI apparatus according to an embodiment of the disclosure.

Referring to FIG. 8, in the present embodiment, in addition to determining an appropriately scaled display depth (s.$d_{measured1}$) in proportion (by scaling factor 's') to the (filtered and time averaged) measured depth '$d_{measured1}$', it is ensured that a horizontal display water level 17 is superimposed across a nose-down (or nose-up) display vehicle 110, such that it goes through (or is at least very close to) a point spaced by a distance (s.$d_{measured1}$) above the inclined ground level (see G2 in FIG. 8 on display 95e) at a longitudinal position from the front of the display vehicle ($L_{sensor\ to\ front}$) that is equivalent to the longitudinal position ($R_1$) relative to the actual vehicle 10, whereat the measurement of the water depth $d_{measured1}$ was taken.

In FIG. 8, the distance (s.$d_{measured1}$) is shown as perpendicular to the inclined level G2 representing the ground level. This inclined display ground level G2 is positioned at a display longitudinal angle $\theta_{dis\text{-}long}$ that may differ from the angle of the terrain on which the measurement was taken. The display depth is displayed at the point 21 perpendicularly offset by the distance S.$d_{measured}$ from the inclined display ground level G2 at the point at which the measurement was taken such that when the horizontal display 17 is superimposed as a horizontal line 17 passing through point 21, the scaled display depth is accurately represented at or approximately at the longitudinal position $R_1$ at which it was measured.

Figure 9:
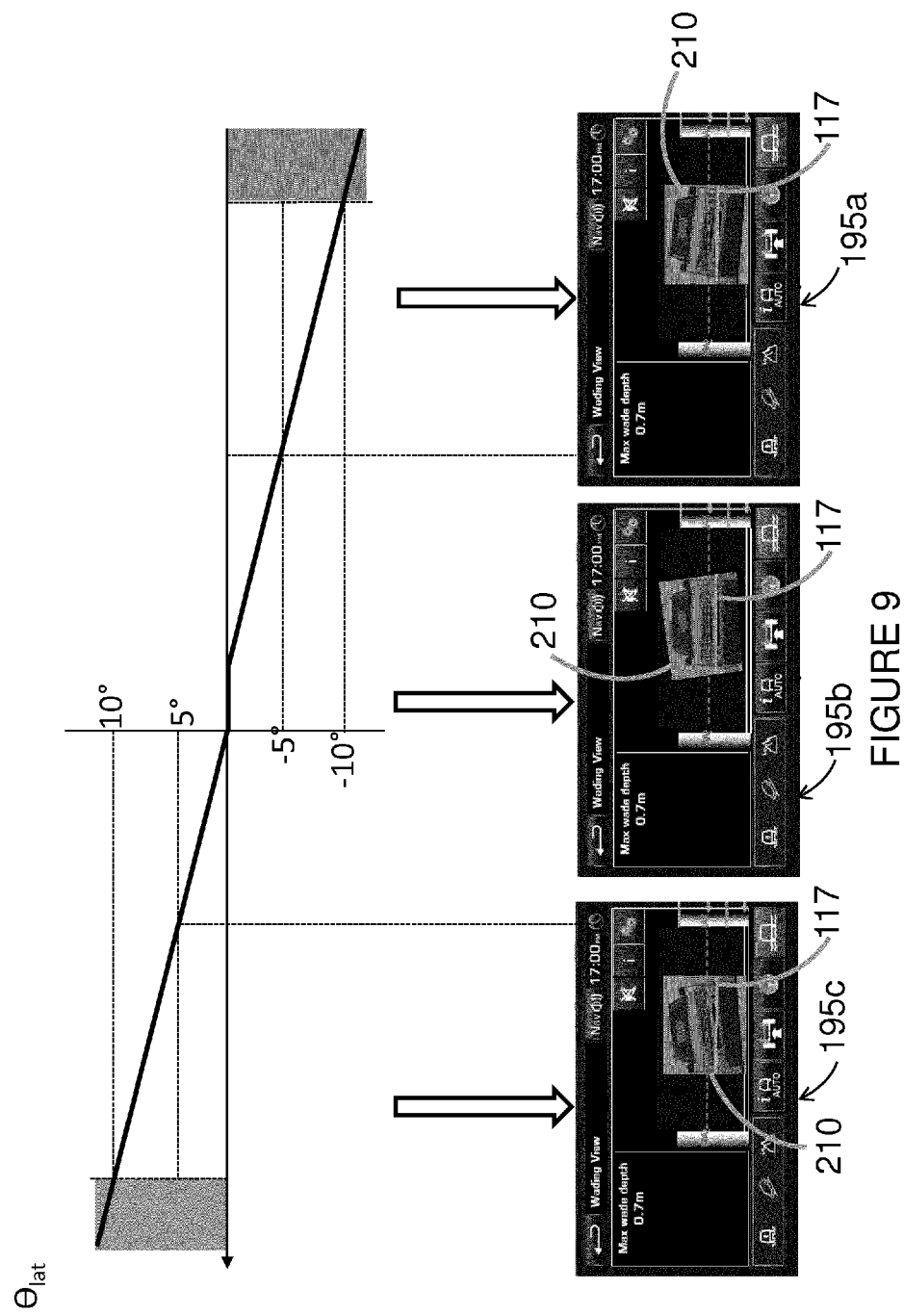
FIG. 9 is a graphical representation of a range of measured actual vehicle lateral gradients and corresponding illustrations that are displayed on the in-vehicle cabin HMI-apparatus at those measured actual vehicle lateral gradients, showing a front elevation of a display vehicle in a right-side low position; a laterally level position; and a left-side low position respectively, (all relative to a notional horizontal axis of said display), according to an embodiment of the disclosure.
Figure 10:
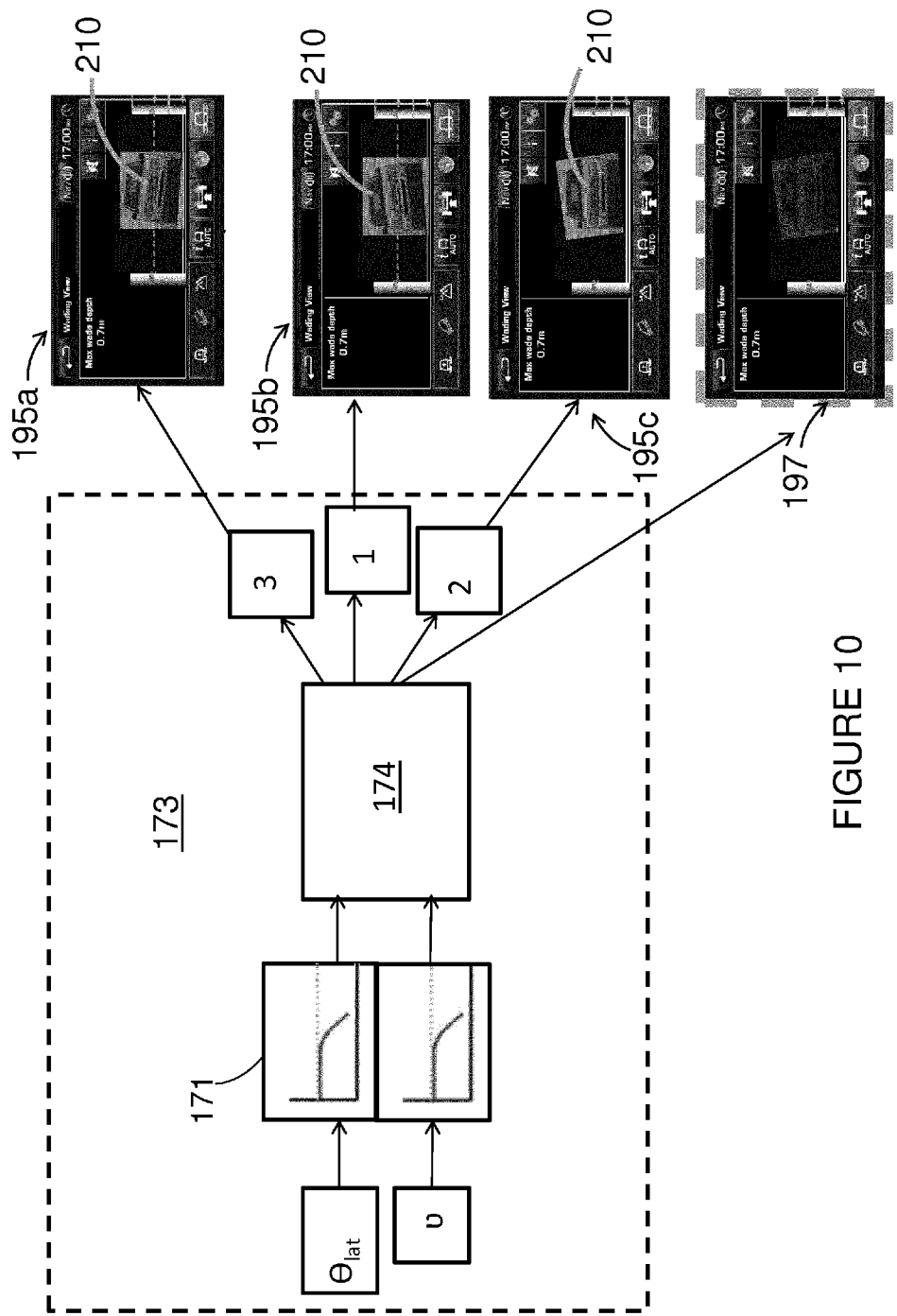
FIG. 10 is a schematic illustration of another algorithm conducted by a program when running on a processor of the system illustrated in FIG. 9 according to an embodiment of the disclosure.

A further optional aspect of the method of controlling the HMI-apparatus 52 includes determining a measured lateral gradient $\theta_{lat}$ of the vehicle 10 using the (or another) attitude measurement apparatus 62 (see FIGS. 9 and 10). When the left-side (considered from the driver's point of view) of the vehicle 10 is lower than the right-side (again considered from the driver's point of view), the actual vehicle's 10 position is referred to as a "left-side low" position. When the right-side (considered from the driver's point of view) of the vehicle 10 is lower than the left-side (again considered from the driver's point of view), the actual vehicle 10 position is referred to as a "right-side low" position.

Upon receipt of the measured lateral gradient $\theta_{lat}$ data signal from the attitude measurement apparatus 62, the control unit 80 is optionally, additionally or alternatively configured to determine in which position, of a limited selection of positions, a front or rear elevation of the display vehicle 210 (see FIG. 9) is illustrated. (By "position" it is meant lateral gradient relative to a horizontal 'H' of the display). In the presently described aspect, the control unit 80 categorizes a current value of measured lateral gradient $\theta_{lat}$ of the actual vehicle 10. For example and as shown in FIG. 9, a measured lateral gradient $\theta_{lat}$ is categorized as or identified by a value "1", "2" and "3". The values "1", "2" and "3" represent or correspond to:

a display vehicle 210 in a laterally level position relative to a notional horizontal axis of the display 195b;

a left-side low position relative to a notional horizontal axis of the display 195a; and a right side low position relative to a notional horizontal axis of the display 195c.

The actual lateral display angle of the display vehicle 210 in the three positions corresponding to the values "1", "2", and "3" of a third series of selectable values (which represent a second series of positions of display vehicle 210) may optionally be about 10°, zero and about −10°.

It will be understood from reading the foregoing that a negative lateral gradient refers to a lateral gradient when the vehicle 10 or display vehicle 210 is in a right-side low position (195c), whereas a positive lateral gradient refers to a lateral gradient when the vehicle 10 or display vehicle 210 is in a left-side low position (195a).

The measured lateral gradient value $\theta_{lat}$ comprises a value from a fourth range of values that comprises a significantly greater number of values than said third series of values representing selectable positions of display vehicle. For example, in the present arrangement, the lateral gradient $\theta_{lat}$ is measurable between about −45° and about 45° by an analog accelerometer. By categorizing the large range of measured values of $\theta_{lat}$ into far fewer discrete categories or values, a graphical display is produced by at least some embodiments of the present method that is far simpler to digest than a graphical display depicting the actual and often rapidly changing actual measured lateral gradient values $\theta_{lat}$.

An embodiment of an algorithm 173 may be used by the control unit 80 for categorizing or otherwise converting the measured lateral gradient $\theta_{lat}$ into a value ("1", "2" or "3") which represents a position of a display vehicle 210 at a specific and predetermined display lateral gradient $\theta_{dis\_lat}$. The measured lateral gradient $\theta_{lat}$ data signal is input into a filtering block 171, wherein the data signal is mathematically low-pass filtered. Before or after (preferably after) filtering, the measured lateral gradient data signal may be averaged in sample periods in order to derive an average measured lateral gradient $\theta_{lat}$ for each sample period. Then, based upon the value of the manipulated measured lateral gradient $\theta_{lat}$, a value ("1", "2" or "3") corresponding to the selectable positions of display vehicle at a display lateral gradient $\theta_{dis\_lat}$, is derived from the following equations:

$$T_{TSA} \leq \theta_{lat} \leq T_{FSA}, \quad (4)$$

$$T_{FSA} < \theta_{lat} < T_{SSA}, \quad (5)$$

$$T_{FOSA} < \theta_{lat} < T_{TSA}, \quad (6)$$

wherein $T_{FSA}$ is a first lateral angle threshold, which optionally is about 5°; wherein $T_{SSA}$ is a second lateral angle threshold, which is optionally about 10°; wherein $T_{TSA}$ is a third lateral angle threshold, which is optionally about −5° (minus five degrees); and wherein $T_{FOSA}$ is a fourth lateral angle threshold, which is optionally about −10° (minus ten degrees).

If the measured lateral gradient $\theta_{lat}$ satisfies equation (4) above, then the value is "1", which corresponds to showing the display vehicle 210 in a laterally level position (having a display lateral gradient $\theta_{dis\_lat}$ of zero) (see display 195b in FIGS. 9 and 10).

If the measured lateral gradient $\theta_{lat}$ satisfies equation (5) above, then the value is "3", which corresponds to showing the display vehicle in a left-side low position (having a display lateral gradient $\theta_{dis\_lat}$ of about 10°).

If the measured lateral gradient $\theta_{lat}$ satisfies equation (6) above, then the value is "1", which corresponds to showing the display vehicle in a right-side low position (having a display lateral gradient $\theta_{dis\_lat}$ of about 70°.

In words, the above equations and consequences may be written out as:
(4) Display a front and/or read elevation of the display vehicle on an active display in said laterally level position ($\theta_{dis\_lat}$=zero):
  (a) if said measured lateral gradient $\theta_{lat}$ is less than or equal to the first lateral angle threshold $T_{FSA}$; and
  (b) if said measured lateral gradient $\theta_{lat}$ is greater than or equal to the third lateral angle threshold $T_{TSA}$.
(5) Display a front and/or rear elevation of the display vehicle on an active display in said left-side low position ($\theta_{dis\_lat}$=10°):
  (a) if said measured lateral gradient $\theta_{lat}$ is greater than the first lateral angle threshold $T_{FSA}$; and
  (b) if said measured lateral gradient $\theta_{lat}$ is less than the second lateral angle threshold $T_{SSA}$.
(6) Display a front and/or rear elevation of the display vehicle on an active display in the right-side low position ($\theta_{dis\_lat}$=−10°)
  (a) if said measured lateral gradient $\theta_{lat}$ is less than the third lateral angle threshold $T_{TSA}$; and
  (b) if said measured lateral gradient $\theta_{lat}$ is greater than the fourth lateral angle threshold $T_{FOSA}$.

In the presently described embodiment, the front or rear elevation of a display vehicle is only shown on an active display in the positions identified by "1", "2" and "3". In this way the display graphics of the HMI apparatus 52 are again simplified compared to the true measured vehicle's 10 lateral gradient. The true measured vehicle's 10 lateral gradient is not necessarily shown. In fact at times the display vehicle 210 is shown as level when the actual vehicle 10 is on a shallow lateral incline; and at times the display vehicle 210 is shown on a 10° lateral incline when the true actual incline is only 6°. However the information communicated to the driver is sufficiently accurate to convey to the driver a water level guide relative to the vehicle 10 that is useful to the driver in navigating the vehicle through the body of water and over the terrain.

In at least some embodiments, the "simplified" approach beneficially presented again avoids a flickering display graphic that changes so rapidly in response to changing vehicle lateral gradient that information cannot be assimilated or understood sufficiently easily. On bumpy and uneven terrains, illustrating every minor variation in terrain could generate a display changing very rapidly. It is therefore beneficial in at least some embodiments that the system 90 only shows larger, more substantial changes in terrain lateral gradient and has a steady display.

Furthermore, in at least some embodiments, the system 90 is beneficial in that a change from a currently displayed position of the display vehicle 210 to a new position of the display vehicle 210 is only permitted if certain boundary conditions are met. In the situation where an active display 195a, 195b, 195c shows a display vehicle 110 in a current lateral position, optionally identified by either a "1" (laterally level position), "2" (a left-side low position), or a "3" (a right-side low position), that current position shall not change to a new position of the display vehicle 210 until the detected measured lateral gradient $\theta_{lat}$ continuously returns the identifier value corresponding to the new position for a pre-specified period of time. In other words, the new position identifier must be true for a set time period before the display vehicle 210 is shown in that new position. Optionally, in one embodiment, the predetermined period is 0.7 s. In at least some embodiments, the predetermined period is calibrateable and optionally may be selected between 0.1 s and 3 s. In this way flicker of an active display 195a, 195b, 195c can be avoided or at least minimized (depending upon the specified time period). Since it is desirable to balance the provision of an accurate display with the requirement to avoid a rapidly updating display, a predetermined period of about 0.7 s may be optimal.

In an alternative arrangement, flicker is reduced by logging consecutive value readings of the detected measured lateral gradient $\theta_{lat}$. In an embodiment, only if the detected measured lateral gradient $\theta_{lat}$ corresponding to the new position is logged for a predetermined consecutive number of logged counts or samples will the system 90 cause the active display 195a, 195b, 195c to show the display vehicle 210 in the new position. It will be appreciated that in dependence upon the sampling frequency a counted number of samples may correspond to a certain time period and essentially defining a boundary condition by a requirement for certain criteria to be met for a specified time period may be equivalent to defining a boundary condition by a requirement for certain criteria to be met for a continuous number of consecutive samples.

Using the method disclosed herein, in at least some embodiments, the display of graphics representing the measured data does not merely smooth out the measured data by averaging over time, but manipulates the measured lateral gradient data more intuitively such that a front and/or rear elevation of a display vehicle 210 is only shown in a laterally right-side or left-side low position when the actual vehicle 10 is at a substantially laterally inclined position at which the driver should take note. By sharply stepping from a level display vehicle 195b when the actual vehicle 10 is level or only at a shallow lateral incline or decline, to a display vehicle 210 in a clear and prominent left-side low 195a or right-side low 195c position when the actual vehicle 10 is in a more substantially laterally inclined position, the driver is more likely to note the information that is being conveyed compared to if the display vehicle's 210 position constantly changed with each bump and dip on an uneven driving surface. Optionally, the first and third lateral gradient thresholds $T_{FSA}$ and $T_{TSA}$ are about 5° and −5° respectively; however in other embodiments and in dependence upon vehicle configuration and performance ability, other values for the first and third lateral gradient thresholds $T_{FSA}$ and $T_{TSA}$ may be useful.

The second and fourth lateral gradient thresholds $T_{SSA}$ and $T_{FOSA}$ may be about 10° and −10° respectively. However in other embodiments and in dependence upon vehicle configuration and performance ability, other values for the first and third lateral gradient thresholds $T_{FSA}$ and $T_{TSA}$; and second and fourth lateral gradient thresholds $T_{SSA}$ and $T_{FOSA}$ may be useful.

Optionally, in view of an average of the detected measured lateral gradient $\theta_{lat}$ being used in the methods of the disclosure, to avoid a time-average data signal being significantly and incorrectly skewed by a spike (or dip) in the detected measured lateral gradient $\theta_{lat}$, the data signal of the detected measured lateral gradient $\theta_{lat}$ may be amplitude modified. The data signal of the detected measured lateral gradient $\theta_{lat}$ may be permitted to have a maximum and/or minimum value that is close to upper and lower lateral angle thresholds. For example, the data signal of the detected measured lateral gradient $\theta_{lat}$ which is input into algorithm 173, may have a maximum value close to the second lateral gradient threshold $T_{SSA}$ and/or may have a minimum value close to the fourth lateral gradient threshold $T_{FOSA}$. In arrangements where the second lateral gradient threshold $T_{SSA}$ is 10°, the maximum value the data signal of the detected measured lateral gradient $\theta_{lat}$ is permitted to have may be about 11°; and similarly, in arrangements where the fourth lateral gradient threshold $T_{FOSA}$ is −10° (minus ten degrees), the minimum value the data signal of the detected measured lateral gradient $\theta_{lat}$ is permitted to have may be about −11° (minus eleven degrees).

In embodiments where a display screen of the HMI apparatus 52 displays a front and/or rear elevation of a display vehicle 210, this may be provided in addition to or in the alternative to a side elevation of a display vehicle 110.

In other envisaged embodiments a perspective view of a display vehicle in three-dimensions is shown in order to convey from the front and/or rear of the vehicle a current lateral and/or longitudinal gradient. Such a graphic may be more complex, however, and as such a side elevation and/or front and/or rear elevation may be represented in two-dimensions.

Returning now to the illustrated examples, in an active display 95, 95a, 95b, 95c, 95d, 95e a display water level 17 is superimposed on the side elevation of the display vehicle 110. In at least some embodiments, the display water level 17 is optionally illustrated as a horizontal straight line across the side elevation of the display vehicle 110. In embodiments where a front and/or rear elevation of the display vehicle 210 is illustrated, a display water level 117 may also be illustrated as a horizontal straight line across the front and/or rear elevation of the display vehicle 210.

Figure 2:
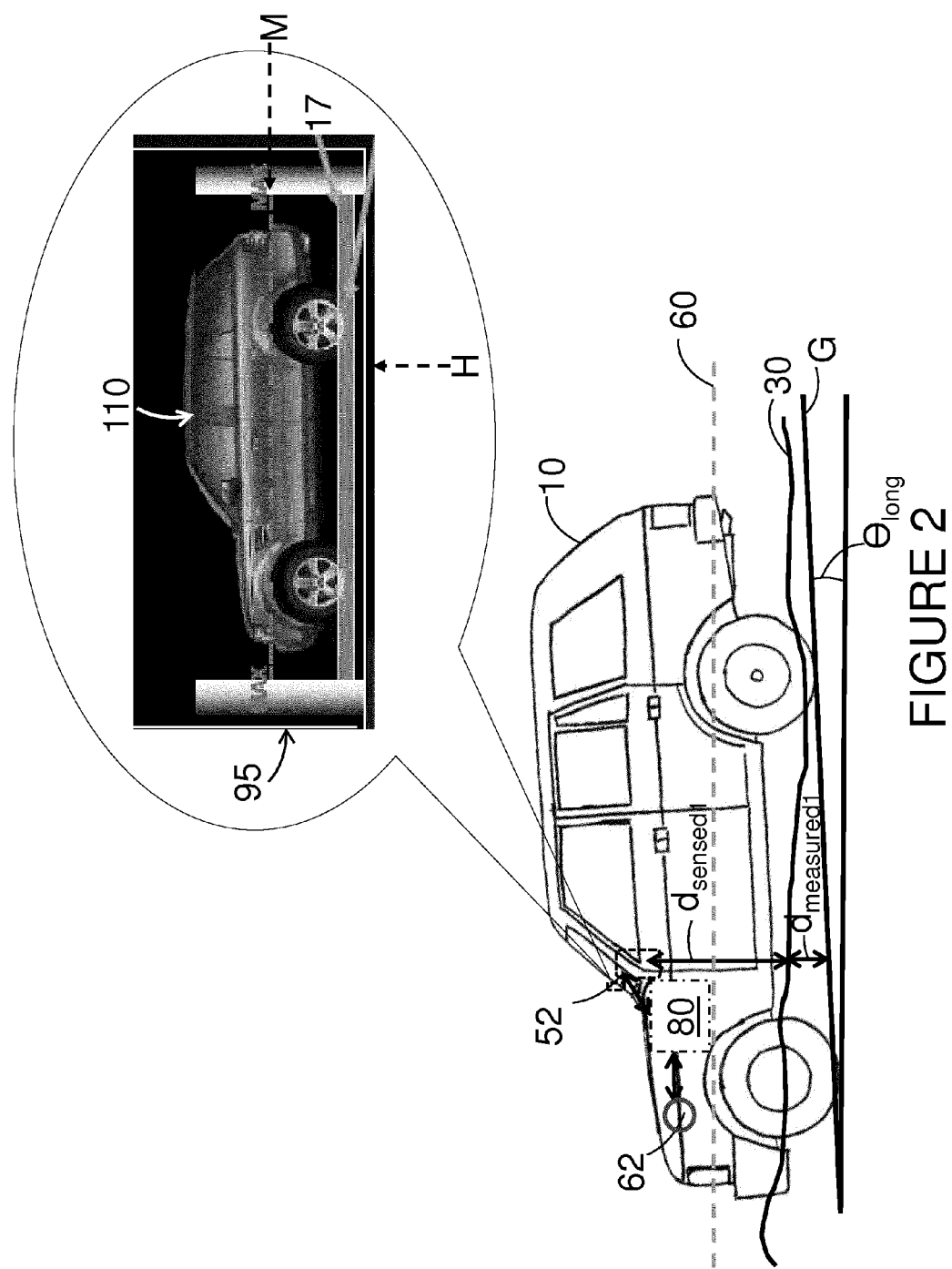
FIG. 2 is a similar side view of the vehicle shown in FIG. 1, albeit some reference numerals are omitted and the vehicle is shown on a shallow longitudinal gradient and in a nose-down scenario. Additionally in FIG. 2, there is shown an enlarged view of an illustration of a display vehicle which is provided on a display screen of the HMI-apparatus, according to an embodiment of the disclosure.

Returning now to the active display 95 of FIG. 2, there is shown a side elevation of the display vehicle 110 in a longitudinally level position relative to a horizontal axis 'H' of the display 95. Optionally a warning line 'M' is superimposed on the display vehicle 110. The warning line is a straight line, optionally dashed and optionally in the color red and is positioned, in scale, on the display vehicle 110 at a height such that it represents the position of a maximum wading depth 60 of the actual vehicle 10 in its current configuration.

As can be seen in FIG. 2, the vehicle 10 is wading in relatively shallow water that is slightly deeper towards the front end of the vehicle 10 than it is towards the rear end of the vehicle 10. The difference in water level at the front and rear ends of the vehicle is in part due to the shallow decline the vehicle 10 is travelling down and may in part be due to a bow wave effect (referred to in greater detail below). In at least some embodiments, the system 90 is configured to compute a display depth in dependence upon the measured water depth ($d_{measured1}$, $d_{measured2}$) or measured water level using data obtained from the one or more sensors 14a, 14b of the measurement apparatus. The sensors 14a, 14b on the vehicle 10 which measure water depth ($d_{measured1}$, $d_{measured2}$) are positioned at, for example, a limited number of discrete locations relative to the vehicle 10. In this example, the sensors are on the same lateral axis (x-axis) of the vehicle 10 and at the same longitudinal position relative to the front end of the vehicle 10. As such a limited amount of data is gathered relating to the actual water level or water depth. This is beneficial in some respects because it minimises the processing time and resource involved in receiving, filtering and averaging, as well as analyzing and comparing the raw data from a multitude of sensors. Furthermore, whereas the actual level of the surface 30 of the water 20 (see FIGS. 1 and 2) can vary along the length of the vehicle 10, accurately illustrating the same varying water level via the HMI-apparatus 52 may provide a complex graphic, which would fluctuate rapidly. Beneficially in the present system 90 a display water level 17, 117 is depicted as a straight line. The straight line is optionally disposed parallel to the horizontal axis 'H' of the display 95, 195. The height of the display water level 17 relative to the display vehicle 110 is selected in dependence upon the measured water depth ($d_{measured1}$, $d_{measured2}$). This is described in further detail below.

In at least some embodiments, the system 90 is further configured to identify scenarios wherein provision of an active display 95, 95a, 95b, 95c, 95d, 95e; 195a, 195b, 195c or other wading warning alert to the driver may be misleading. In such embodiments, the system 90 is therefore advantageously configured to take appropriate action to avoid misleading the driver. For example, at a steep longitudinal or lateral incline, the water level measurement may be affected and the accuracy of the display depth thereby determined may not always accurately represent the true depth of water relative to the vehicle 10. According to another aspect of the method of the present disclosure, the system 90 therefore limits the display of an active display 95, 95a, 95b, 95c, 95d, 95e; 195a, 195b, 195c (being a display with a display water level 17, 117), in dependence upon certain vehicle parameters. As such, in dependence upon one or more vehicle parameters, including the measured lateral gradient and/or the measured longitudinal gradient, the HMI-apparatus 52 is either populated with an "active display" 95, 95a, 95b, 95c, 95d, 95e; 195a, 195b, 195c comprising an illustration of the display water level 17, 117 or a display depth 21; or the HMI-apparatus 52 is populated with a "holding display" 97, 97a, 97b; 197. In the present embodiment, the one or more vehicle parameters additionally includes vehicle speed. In other embodiments, vehicle direction and/or other factors may be considered in an assessment by the control unit 80 as to whether an accurate display water level 17, 117 or display depth 21 can be presented to the driver or not.

As described above and as illustrated in FIGS. 2, 3, 4 and 7 an "active display" 95a, 95b, 95c 95d comprises a side elevation of the display vehicle 110. Alternatively or additionally, in other embodiments, an "active display" 195a, 195b, 195c comprises a front elevation of the display vehicle 210 (see FIGS. 9 and 10). In yet further additional or alternative embodiments, an "active display" comprises a rear elevation of the display vehicle (not shown). In each case, upon the elevation of the display vehicle 110, 210 in an active display 95a, 95b, 95c 95d, 195a, 195b, 195c the display water level 17 is superimposed. In contrast, in a holding display 97a, 97b; 197 no display water level is superimposed upon the display vehicle 110, 210. Alternatively or additionally other wading alerts, for example an audible beep of increasing frequency or pitch with increasing proximity to the maximum wading depth of the vehicle 10 may also be suspended whilst a "holding display" 97a, 97b; 197 is presented. Referring to the illustrated arrangements, the graphic of the display vehicle 110, 210 in the "holding display" 97a, 97b; 197 is optionally more faded or is more transparent than aspects of the active display 95a, 95b, 95c 95d; 195a, 195b, 195c.

Figure 5:
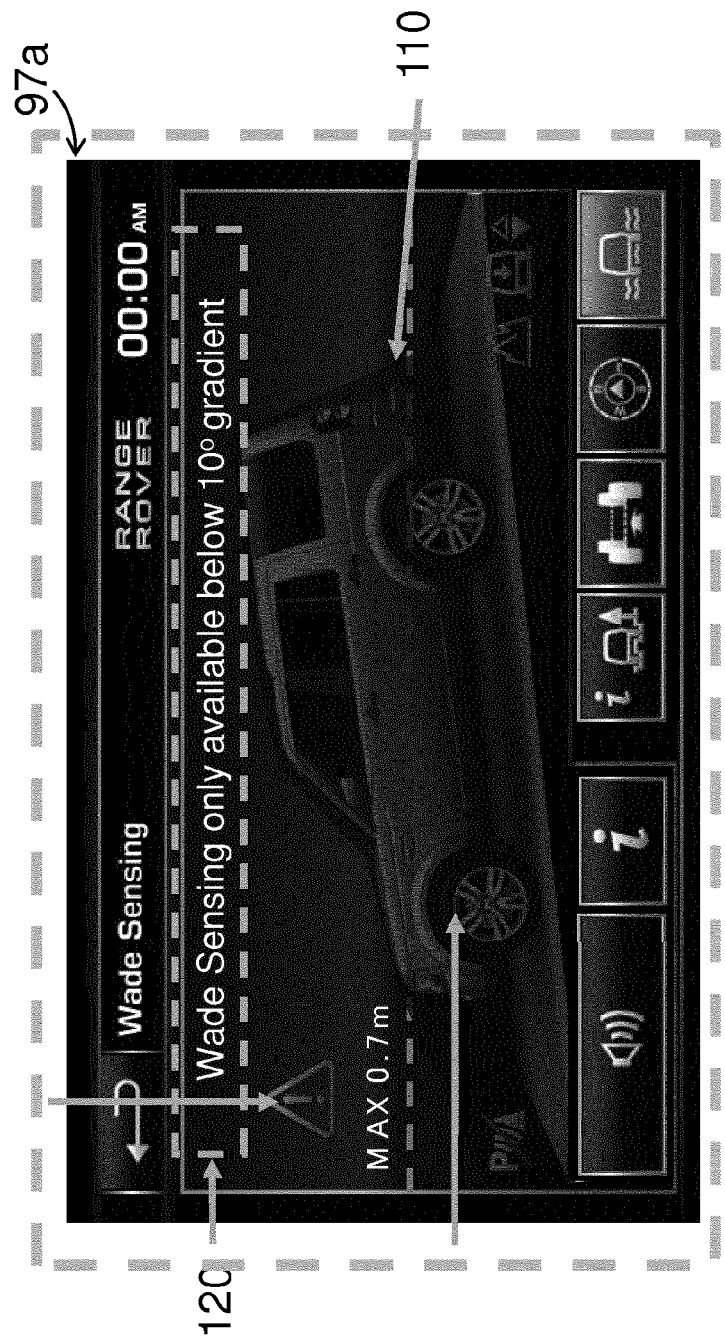
FIG. 5 is a further illustration of a display vehicle that is shown on a display screen of an HMI-apparatus according to an embodiment of the disclosure.

Referring to FIG. 5, a holding display 97a is shown therein which is used in a scenario wherein the system 90 detects that the vehicle 10 is travelling on an incline having a longitudinal gradient $\theta_{long}$ that exceeds the fourth longitudinal angle threshold $T_{FOLA}$. This limit is optionally a downward longitudinal gradient greater than 10°. This limit triggers the display of a holding display 97a. In FIG. 5 it can be seen that the position of the display vehicle 110 is shown in the nose-down display position but that the display vehicle 110 is "greyed-out" (i.e. more faded or more transparent) and thereby visually distinguished from a display vehicle 110 of an active display 95, 95a, 95b, 95c. No display water level is shown and a textual warning 120 is provided for conveying to the driver that the HMI apparatus 52 is functioning properly and yet deliberately is not providing an active display with a display water level. Optionally the textual warning may state "wade sensing only available below 10° gradient". It will be recognized that other suitably worded textual warnings may be provided.

Figure 6:
FIG. 6 is a further illustration of a display vehicle that is shown on a display screen of an HMI-apparatus according to yet another embodiment of the disclosure.

Referring to FIG. 6, a holding display 97b is shown therein which is used in a scenario wherein the system 90 detects that the vehicle 10 is travelling at a vehicle speed V that exceeds a vehicle speed threshold $V_{max}$. The vehicle speed threshold limit $V_{max}$ is optionally about 18 kph. In the algorithm 67 of FIG. 7, a processing block 66 may filter and/or time average a data signal relating to actual vehicle speed V; and at processing block 70, this may be considered along with the current measured longitudinal gradient $\theta_{long}$ and/or with the current measured lateral angle $\theta_{lat}$ in order to determine whether the vehicle 10 is travelling at a vehicle speed V that exceeds a gradient dependant vehicle speed threshold $V_{max}$. Reaching or exceeding this limit triggers the display of a holding display 97b. In FIG. 6 it can be seen that the position of the display vehicle 110b is in the longitudinally level display position but that the display vehicle 110b is "greyed-out" (i.e. more faded or more transparent and thereby visually distinguished from a display vehicle 110 of an active display 95b). No display water level is shown and a textual warning 120b is provided for conveying to the driver that the HMI apparatus 52 is functioning properly and yet deliberately is not providing an active display with a display water level. Optionally the textual warning 120b may state "speed too high (max '$V_{max}$')". It will be recognized that other suitably worded textual warnings may be provided.

In additional embodiments a measured longitudinal gradient $\theta_{long}$ and/or a measured lateral gradient $\theta_{lat}$ is considered in combination with vehicle speed. In this way, a clear warning can be given to encourage the driver to slow down to avoid negative consequences that may arise from progressing a vehicle down a slope into water too quickly.

Figures 6A, 6B:
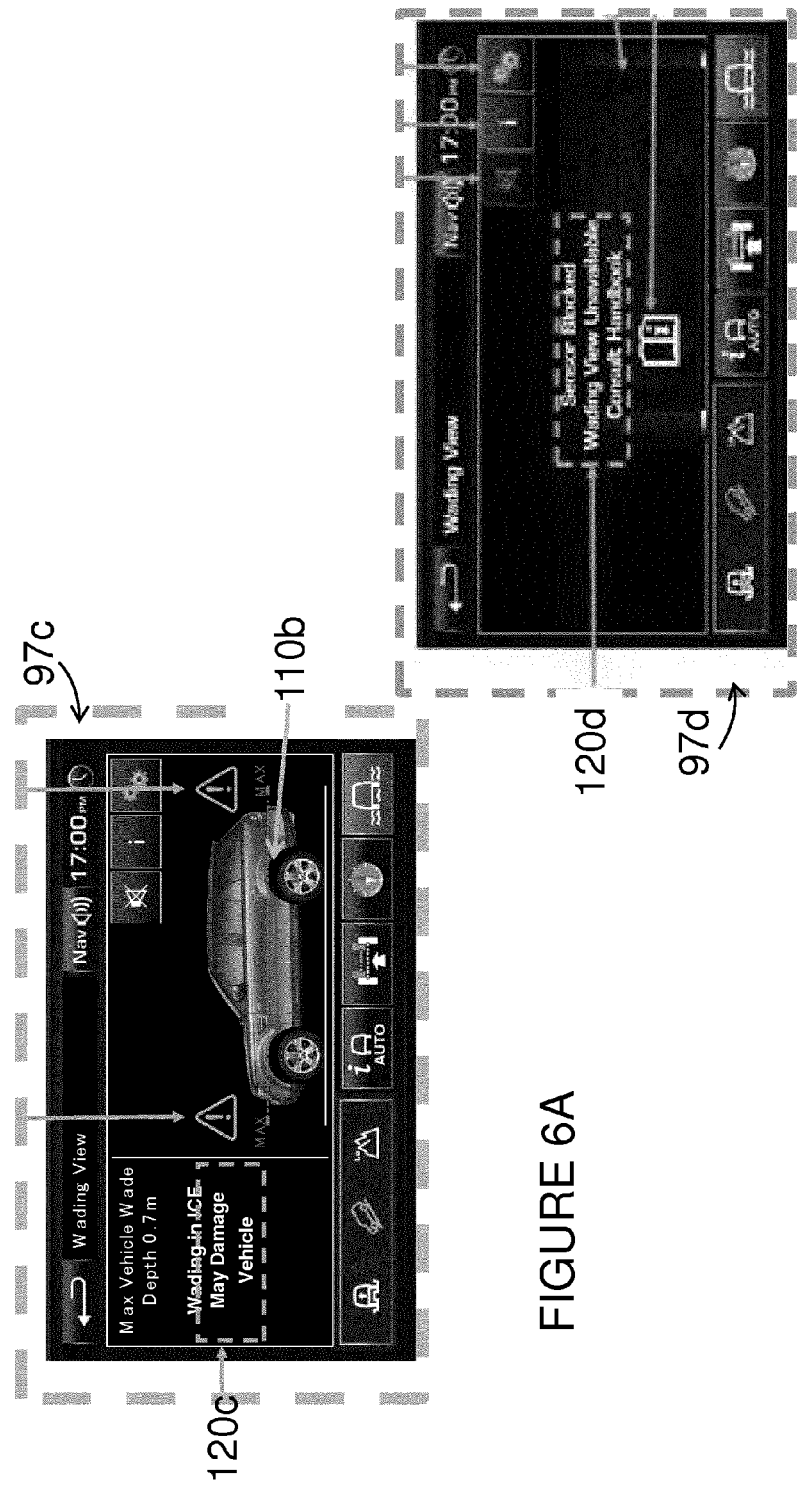
FIG. 6A is yet a further illustration of a holding display screen of an HMI-apparatus according to yet another embodiment of the disclosure.
FIG. 6B is yet another illustration of a failure display screen of an HMI-apparatus according to an embodiment of the disclosure.

Referring to FIG. 6A a holding display 97c is shown therein which is used in a scenario wherein the system 90 detects that the vehicle 10 is travelling in water that is below a threshold temperature. This threshold temperature is optionally about 1° C. Detection of a temperature at or below the threshold temperature triggers the display of a holding display 97c. In FIG. 6A it can be seen that the position of the display vehicle 110b is in the longitudinally level display position and that although the display vehicle 110b is not "greyed-out", no display water level is shown and a textual warning 120c for conveying to the driver that the HMI apparatus 52 is functioning properly and yet deliberately is not providing an active display with a display water level is provided. Optionally the textual warning 120c may state "Wading in Ice may damage vehicle". It will be recognized that other suitably worded textual warnings may be provided to convey to the driver that serious consequences may result from driving the vehicle in ice, which for example may include damage to the bumper, radiator, oil cooler, radiator grill etc.

Referring to FIG. 6B a failure display 97d is shown therein which is used in a scenario wherein the system 90 detects a fault with a sensor of the vehicle 10. The system 90 may receive a sensor from a signal indicative of the sensor's failure which may be considered as a vehicle parameter which triggers the failure display 97d to be shown. This fault and the inability of the system 90 to function properly is highlighted by not showing a display vehicle at all and by displaying a textual warning 120d for conveying to the driver that the HMI apparatus 52 is not able to function properly because of a system error. Optionally the textual warning 120d may state "Sensor blocked wading view unavailable consult handbook". It will be recognized that other suitably worded textual warnings may be provided to convey to the driver that the system 90 has failed.

In at least some embodiments, a holding display 97a, 97b, 97c; 197 according to the disclosure is beneficial compared with, for example, a blank or blacked out display, for example. Whilst a blank display screen could be used to not present a water level guide in circumstances where it is determined by the control unit 80 that it is not appropriate to display a water level guide, using a blank screen may undesirably cause the driver to consider that the system 90 and/or HMI apparatus 52 has failed and that no wading assistance was being provided by the system 90 due to its failure rather than because of the scenario the vehicle 10 is actually in. The holding display 97a, 97b, 97c; 197 of the present disclosure, however, clearly shows that the system 90 is fully functioning and that it is a deliberate decision of that fully functioning system 90 not to display a water level 17 or other water level guide (e.g. audible beep). Text 120, 120b, 120c on the holding display 97a, 97b, 97c; 197 may state the reason in words as to why a water level guide is not being presented. The graphical display provided by the HMI-apparatus 52 is also optionally visually contrasted with an active display 95a, 95b, 95c, 95d, preferably by fading of the display vehicle 110a, 110b and or other graphics provided in the holding display 97a, 97b, 97c; 197.

In at least some embodiments, the system 90 is configured such that a holding display 97a, 97b, 97c; 197 is only triggered or an active display 95, 95a, 95b, 95c; 195a, 195b, 195c is only reactivated if certain boundary conditions are met. This is to avoid the display flickering between an active display 95, 95a, 95b, 95c; 195a, 195b, 195c and a holding display 97a, 97b, 97c; 197. The boundary conditions for determining whether to trigger a holding display from an active display 95, 95a, 95b, 95c; 195a, 195b, 195c may be different to the boundary conditions for determining whether to trigger an active display 95, 95a, 95b, 95c; 195a, 195b, 195c from a holding display 97a, 97b, 97c; 197 and may vary in dependence upon the vehicle parameter or combination of vehicle parameters that trigger the change from an active display 95, 95a, 95b, 95c; 195a, 195b, 195c to a holding display 97a, 97b, 97c; 197 (and vice versa).

Optionally, a first general boundary condition may require that an active display 95, 95a, 95b, 95c; 195a, 195b, 195c shall change to a holding display 97a, 97b, 97c; 197 only if the vehicle parameter criteria required to trigger the change is continuously true for a pre-specified period of time. In other words, the detection of the vehicle parameter at or beyond a threshold must be true for a set time period before the holding display 97a is triggered. Optionally, in one embodiment, the predetermined period is 0.7 s. In at least some embodiments, the predetermined period is calibrateable and optionally may be selected between 0.1 s and 3 s.

A second general boundary condition may require that a holding display 97a, 97b, 97c; 197 shall change to an active display 95, 95a, 95b, 95c; 195a, 195b, 195c only if the vehicle parameter criteria required to trigger the change is continuously true for a pre-specified period of time. In other words, the detection of the vehicle parameter within a threshold must be true for a set time period before the active display 95, 95a, 95b, 95c; 195a, 195b, 195c is triggered. Optionally, in one embodiment, the predetermined period is shorter than the time period of the first general boundary condition and may be about 0.5 s. Advantageously an informative (active) display is returned to more quickly than it is "switched off". In at least some embodiments, the predetermined period is calibrateable and optionally may be selected between 0.1 s and 3 s.

In an alternative arrangement, flickering between an active display 95, 95a, 95b, 95c; 195a, 195b, 195c and a holding display 97a, 97b, 97c; 197 is reduced by logging consecutive value readings of the vehicle parameter. Only if the vehicle parameter giving rise to the change is logged for a predetermined consecutive number of logged counts or samples at a relevant value will the system 90 trigger the holding display (or vice versa trigger the active display). It will be appreciated that in dependence upon the sampling frequency a counted number of samples may correspond to a certain time period and essentially defining a boundary condition by a requirement for certain criteria to be met for a specified time period may be equivalent to defining a boundary condition by a requirement for certain criteria to be met for a continuous number of consecutive samples.

For example, in relation to a holding display 97a triggered by the measured longitudinal gradient $\theta_{long}$, the following expression may characterize the criteria that, if true, triggers the active display 95a, 95c to change to the holding display 97a:

$$T_{SLA} < \theta_{long} < T_{FOLA}, \quad (1h)$$

wherein $T_{SLA}$ is the second longitudinal angle threshold, which is optionally about 10°; and wherein $T_{FOLA}$ is a fourth longitudinal angle threshold, which is optionally about −10° (minus ten degrees).

If, in an embodiment, the measured longitudinal gradient $\theta_{long}$ satisfies equation (1h) above, then a holding display 97a is triggered in which a "greyed-out" display vehicle in a nose-up position (having a display longitudinal gradient $\theta_{dis\_long}$ of about 10°) or in a nose-down position (having a display longitudinal gradient $\theta_{dis\_long}$ of about −10°) is shown.

In words, the above expression and consequences may be written out as:

Display a holding display 97a (optionally showing a side elevation of the display vehicle 110 "greyed-out", in a nose up position ($\theta_{dis\_long}$=+10°) or in a nose down position ($\theta_{dis\_long}$=−10°)):

(c) if the measured longitudinal gradient $\theta_{long}$ is greater than the second longitudinal angle threshold $T_{SLA}$; and (d) if the measured longitudinal gradient $\theta_{long}$ less than the fourth longitudinal angle threshold $T_{FOLA}$.

In at least some embodiments, only if the boundary condition criteria for triggering a holding display based upon measured longitudinal gradient $\theta_{long}$ is true for a predetermined specified period, which optionally may be about 0.7 s, will the holding display be triggered. In this way flickering of the display between an active display and a holding display when the measured longitudinal gradient $\theta_{long}$ is at or about the second longitudinal angle threshold $T_{SLA}$ or the fourth longitudinal angle $T_{FOLA}$ is avoided.

In relation to the re-activation of an active display 95a, 95c from a holding display 97a that is triggered by the measured longitudinal gradient long, the following expression may characterize the criteria that, if true, triggers the active display 95a, 95c to change to the holding display 97a:

$$T_{FRELA} \le \theta_{long} \le T_{SRELA}, \quad (1a)$$

wherein $T_{FRELA}$ is a first re-activation longitudinal angle threshold, which is optionally about 8°; and wherein $T_{SRELA}$ is a second re-activation longitudinal angle threshold, which is optionally about −8° (minus eight degrees).

If, in an embodiment, the measured longitudinal gradient $\theta_{long}$ satisfies equation (1 a) above, then an active display 95a, 95c is triggered in which a display vehicle 110 in a nose-up position (optionally having a display longitudinal gradient $\theta_{dis\_long}$ of about 10°) or in a nose-down position (optionally having a display longitudinal gradient $\theta_{dis\_long}$ of about −10°) is shown.

In words, the above expression and consequences may be written out as:

Display an active display 95a, 95c (optionally showing a side elevation of the display vehicle 110 "greyed-out", in a nose up position ($\theta_{dis\_long}$=+10°) or in a nose down position ($\theta_{dis\_long}$=−10°)):
  if the measured longitudinal gradient $\theta_{long}$ is less than or equal to the second re-activation longitudinal angle threshold $T_{SRELA}$; and
  if the measured longitudinal gradient $\theta_{long}$ is greater than or equal to the first reactivation longitudinal angle threshold $T_{FRELA}$.

In at least some embodiments, only if the boundary condition criteria for triggering an active display 95a, 95c based upon measured longitudinal gradient $\theta_{long}$ is true for a predetermined specified period, which optionally also may be about 0.7 s, will the active display 95a, 95c be triggered. In this way flickering of the display between an active display 95a, 95b and a holding display 97a, 97b when the measured longitudinal gradient $\theta_{long}$ is at or about the second re-activation longitudinal angle threshold $T_{SRELA}$ or the first reactivation longitudinal angle threshold $T_{FRELA}$ is, to some extent at least, avoided. In at least some embodiments, the predetermined period is calibrateable and optionally may be selected between 0.1 s and 3 s.

Of further benefit and again advantageous to minimize flicker optionally, the first and second reactivation longitudinal angle thresholds $T_{FRELA}$ and $T_{SRELA}$ may be less than the second longitudinal angle threshold $T_{SLA}$; and the fourth longitudinal angle thresholds $T_{FOLA}$ respectively. In other words, the measured longitudinal angle $\theta_{long}$ for coming out of the holding display 97, 97a, 97b, 97c is less than the measured longitudinal angle $\theta_{long}$ for going into the holding display 97, 97a, 97b, 97c. In this way once a holding display 97a, 97b has been triggered because the boundary conditions of (1h) above were true for the requisite period, it is only after it is detected that the gradient of the terrain the vehicle 10 is being driven on has significantly shallowed (optionally by 2°), that the active display 95a, 95b will again be triggered. Advantageously an informative (active) display 95a, 95b is returned to only when there is a greater degree of certainty that the information provided by the active display is accurate (because the terrain is more shallow and the system 90 considered to be more accurate).

Similarly, holding displays may be utilized for the lateral display, where used. In one arrangement, upon receipt of the measured lateral gradient $\theta_{lat}$ data signal from the attitude measurement apparatus 62, the control unit 80 is optionally configured to determine whether to maintain an active display 95, 95, 95b, 95c, 95d, 95e of a side elevation of a display vehicle 110 or whether to change to a holding display 97a. Optionally a positive and a negative predetermined lateral gradient threshold are stored in a memory associated with the control unit 80 and the measured lateral gradient $\theta_{lat}$ data signal is compared to the positive and negative predetermined lateral gradient thresholds. If, in an embodiment, the measured lateral gradient $\theta_{lat}$ data signal (optionally after being filtered, sampled and/or time averaged) is at or below the negative predetermined lateral gradient threshold, a holding display, such as a holding display 97a showing a "greyed-out" side elevation of a display vehicle 110, will be triggered. If the measured lateral gradient $\theta_{lat}$ data signal (optionally after being filtered, sampled and/or time averaged) is at or above the positive predetermined lateral gradient threshold, a holding display, such as a holding display 97a showing a "greyed-out" side elevation of a display vehicle 110 will be triggered. Optionally, the positive and negative predetermined lateral gradient thresholds may be about 8° and about −8° respectively. In at least some embodiments, the positive and negative predetermined lateral gradient thresholds are calibrateable and may be determined based upon the design of the vehicle 10.

In such an embodiment, the control unit 80 will return to an active display, such as an active display 95, 95a, 95b, 95c, 95d, 95e, showing a side elevation of a display vehicle 110 upon the measured lateral gradient $\theta_{lat}$ data signal having a value above the negative predetermined lateral gradient threshold and below the positive predetermined lateral gradient threshold. A negative predetermined lateral gradient refers to a lateral gradient when the vehicle 10 is in a right-side low position, whereas a positive predetermined lateral gradient refers to a lateral gradient when the vehicle 10 is in a left-side low position.

In at least some embodiments, the system 90 is configured such that a holding display is only triggered or an active display is only reactivated if certain boundary conditions are met. This is to avoid the display flickering between an active display and a holding display. The boundary conditions for determining whether to trigger a holding display from an active display may be different to the boundary conditions for determining whether to trigger an active display from a holding display.

Optionally, a first lateral boundary condition may require that an active display shall change to a holding display only if the detected measured lateral gradient $\theta_{lat}$ continuously returns a value at or below the negative predetermined lateral gradient threshold for a pre-specified period of time. In other words, the detection of a non-acceptable right-side low lateral gradient must be true for a set time period before the holding display 97a is triggered. Optionally, in one embodiment, the predetermined period is 0.7 s. In at least some embodiments, the predetermined period is calibrateable and optionally may be selected between 0.1 s and 3 s.

A second lateral boundary condition may require that an active display shall change to a holding display only if the detected measured lateral gradient $\theta_{lat}$ continuously returns a value at or above the positive predetermined lateral gradient threshold for a pre-specified period of time. In other words, the detection of a non-acceptable left-side low lateral gradient must be true for a set time period before the holding display 97a is triggered. Optionally, in one embodiment, the predetermined period is 0.7 s. In at least some embodiments, the predetermined period is calibrateable and optionally may be selected between 0.1 s and 3 s.

A third lateral boundary condition may require that a holding display 97a shall change to an active display only if the detected measured lateral gradient $\theta_{lat}$ continuously returns a value above the negative predetermined lateral gradient threshold for a pre-specified period of time. In other words, the detection of an acceptable right-side low lateral gradient must be true for a set time period before the active display 95, 95a, 95b, 95c, 95d, 95e is triggered. The predetermined period is optionally 0.7 s and, in at least some embodiments, is calibrateable and optionally may be selected between 0.1 s and 3 s.

Optionally, the third lateral boundary condition may require that a holding display 97a shall change to an active display only if the detected measured lateral gradient $\theta_{lat}$ continuously returns a value significantly above the negative predetermined lateral gradient threshold, for example, the negative predetermined lateral gradient plus 2°, for a pre-specified period of time. As described above in relation to the boundary condition (1a) for returning to an active display 95a, 95b following a holding display 97a, 97b, it may be beneficial to return to the active display 95a, 95b only once the vehicle 10 is positioned on a more shallow incline or decline.

A fourth lateral boundary condition may require that a holding display 97a shall change to an active display 95, 95a, 95b, 95c, 95d, 95e only if the detected measured lateral gradient $\theta_{lat}$ continuously returns a value below the positive predetermined lateral gradient threshold for a pre-specified period of time. In other words, the detection of an acceptable left-side low lateral gradient must be true for a set time period before the active display 95, 95a, 95b, 95c, 95d, 95e is triggered. Optionally, in one embodiment, the predetermined period is about 0.7 s. In at least some embodiments, the predetermined period is calibrateable and optionally may be selected between 0.1 s and 3 s. As with the third lateral boundary condition, the fourth lateral boundary condition may require that a holding display 97a shall change to an active display only if the detected measured lateral gradient $\theta_{lat}$ continuously returns a value significantly below the positive predetermined lateral gradient threshold, for example, the positive predetermined lateral gradient minus 2°, for a pre-specified period of time.

In an alternative arrangement, flicker is reduced by logging consecutive value readings of the detected measured lateral gradient $\theta_{lat}$ In at least some embodiments, only if the detected measured lateral gradient $\theta_{lat}$ corresponding to the new position is logged for a predetermined consecutive number of logged counts or samples will the system 90 trigger the holding display (or vice versa trigger the active display). It will be appreciated that in dependence upon the sampling frequency a counted number of samples will correspond to a certain time period, and essentially defining a boundary condition by a requirement for certain criteria to be met for a specified time period, may be equivalent to defining a boundary condition by a requirement for certain criteria to be met for a continuous number of consecutive samples.

In the presently illustrated embodiment, the control unit 80 is configured to determine a display depth 21 that is based upon the first and/or second measured depths $d_{measured1}$, $d_{measured2}$. An algorithm 67 that is contained within a program stored on or associated with the control unit 80 and that is executed by the control unit 80 of the system 90 is illustrated schematically in FIG. 7.

Figure 7:
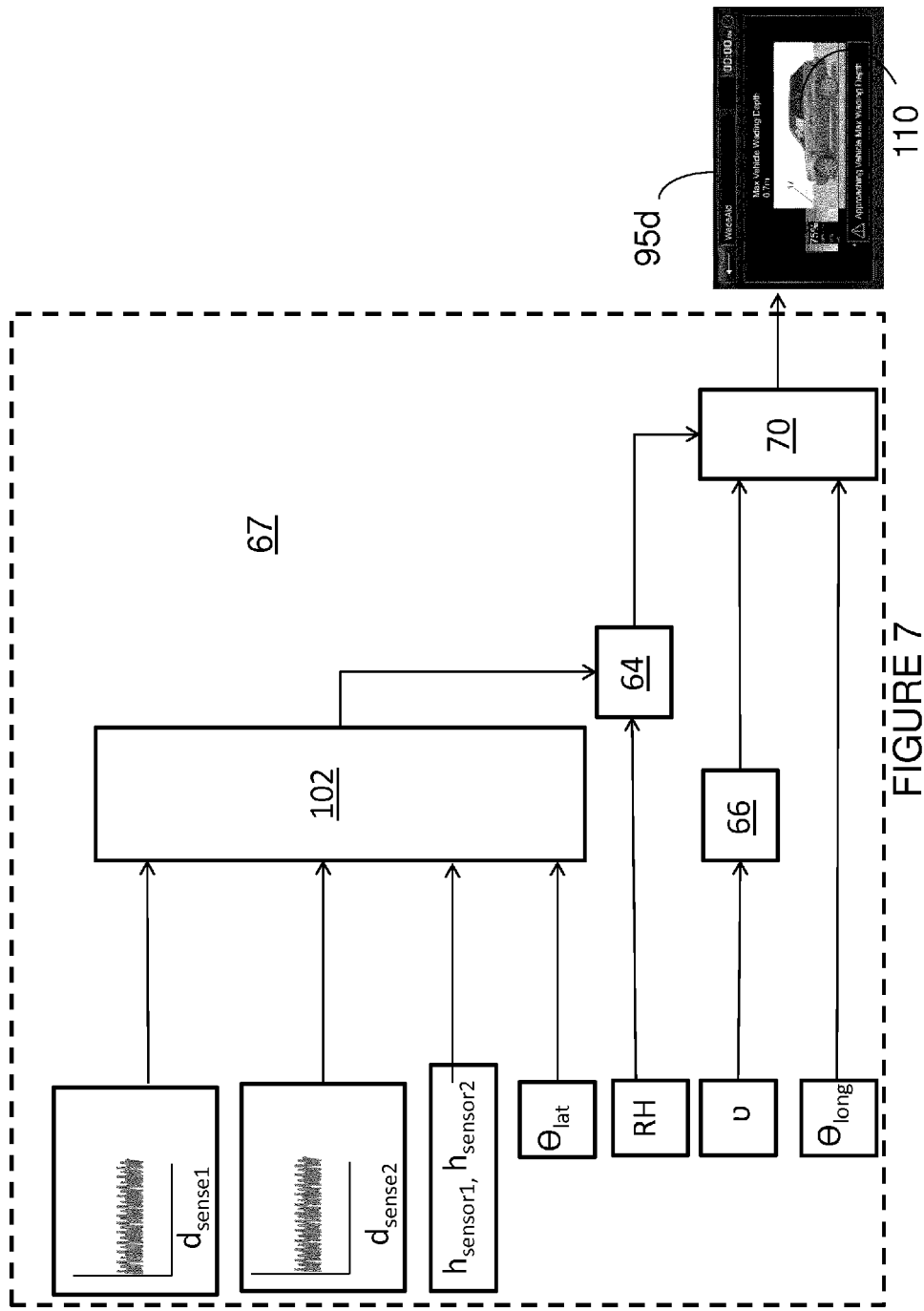
FIG. 7 is a schematic illustration of a further algorithm conducted by a program when running on a processor of the system illustrated in FIG. 1.

In FIG. 7 it can be seen that first and second data signals $d_{sense1}$, $d_{sense2}$ derived from the first and second sensors 14a, 14b are input into the algorithm 67. The distances $d_{sense1}$ and $d_{sense2}$ are optionally each time-averaged over a sample period before being input into a first processing block 102. In addition to the first and second data signals $d_{sense1}$, $d_{sense2}$ from the first and second sensors 14a, 14b the following time varying values of: measured lateral angle $\theta_{lat}$ of the vehicle 10; measured longitudinal angle $\theta_{long}$ of the vehicle 10; current ride height 'RH' of the vehicle 10; and speed V of the vehicle 10 may also be input to the algorithm 67. In addition certain constants may be input, for example the mounting height $h_{sensor1}$, $h_{sensor2}$ of the first and second sensors 14a, 14b.

Information from other vehicle systems may be transmitted directly to the system 90 from the vehicle control system having that data (for example, a suspension system control unit may communicate the ride height 'RH' directly to the control unit 80). Alternatively data such as currently selected (and adopted) ride height 'RH' and vehicle speed V may be transmitted via a vehicle CAN-bus or similar vehicle-based data network.

Interim values for the first and second measured depths $d_{measured1}$, $d_{measured2}$ are determined at processing block 102 by using the following equations:

$$d_{measint1} = h_{sensor1} - d_{sense1}$$

$$d_{measint2} = h_{sensor2} - d_{sense2}$$

Optionally, a checking step may be carried out to determine which of the first and second distances $d_{sense1}$, $d_{sense2}$ and/or first and second interim depth measurements $d_{measint1}$, $d_{measint2}$ should be utilized by the algorithm 67 in determining a display depth. For example, if the measured lateral angle $\theta_{lat}$ of the vehicle 10 indicates that the vehicle 10 is flat or substantially flat, it is reasonable to assume therefore that the actual depths of water beneath the first and second sensors 14a, 14b will be about the same. In addition, if the first and second measured depths $d_{measured1}$, $d_{measured2}$ are about the same, for example are within a tolerance ($\pm \Delta t$) of one another, ($\Delta t$ may be about 100 mm to give consideration to water surface ripples etc.), then the first and second data signals $d_{sense1}$, $d_{sense2}$ may then be averaged with one another (before or after a compensation for the effect of vehicle displacement is carried out).

Alternatively, if the lateral angle $\theta_{lat}$ of the vehicle 10 indicates that the vehicle 10 is on a lateral gradient and if the first and second measured depths $d_{measured1}$, $d_{measured2}$ are different to a degree that would be expected for such a lateral gradient (again within a tolerance $\Delta t$), then, optionally only the data signal derived from the sensor on the lowest side of the vehicle 10 is utilized in determining a display depth.

A compensation may be made to either one of the first and second measured depths $d_{measint1}$, $d_{measint2}$, to their average ($\overline{d_{measint1}, d_{measint2}}$), or to the sensor heights ($h_{sense1}$, $h_{sense2}$) to account for the ride height "RH" of the vehicle 10 by adding a ride height off-set $\Delta RH$. This computation may be performed at block 64 as follows:

$$d_{measured1} = d_{measint1} + \Delta RH,$$

$$d_{measured2} = d_{measint2} + \Delta RH, \text{ or}$$

$$d_{measured} = \overline{d_{measint1}, d_{measint2}} + \Delta RH$$

At processing block 70, the display depth is optionally scaled to determine a scaled display depth 21. The scaled display depth 21 is then extrapolated, optionally linearly, in order to determine the position of a display water level 17, relative to a display vehicle 110, which is shown on the active display screens 95, 95a, 95c, 95d of an in-vehicle HMI apparatus 52 (see FIGS. 2, 3, 4 and 7). Scaling may be desirable for a number of reasons including: applying a safety margin and compensating for differences in the sensed depth viz-a-viz the actual water depth, or to show a display depth that is increased to take into account a bow wave effect (increased water height at the leading edge of the vehicle) created by displacement of water as the vehicle travels therethrough, details of which are given in our co-pending UK patent application GB1319915.3 titled "Vehicle Having Wade Sensing Apparatus And System" filed on 12 Nov. 2013, also in the name of Jaguar Land Rover Limited. Optionally a compensation factor may be configured to adjust the measured depth to create a scaled display depth such that a display level extrapolated therefrom represents the approximate height of an anticipated bow wave (giving consideration to vehicle speed, measured water depth and vehicle longitudinal and lateral gradients).

In dependence upon the measured longitudinal gradient $\theta_{long}$ of the vehicle 10, the display vehicle 110 is shown on a longitudinal incline. In at least some embodiments, where a display vehicle 110 is shown in a nose-up or nose-down position, the display water level 17 (optionally scaled) is shown substantially accurately at the point at which it was measured, i.e. in the region $R_1$. This is particularly advantageous where the vehicle's 10 air intake is positioned close to the door mirror 40a, 40b mounted sensor 14a, 14b as the water depth is then accurately shown in this position.

It can be seen in FIG. 8 that once the scaled display depth 21 has been extrapolated, the resulting display level 17 spans or covers a second longitudinal region $R_2$ relative to the display vehicle 110. It can be seen that the second longitudinal region $R_2$ relative to the display vehicle 110 covers a greater percentage of the longitudinal length of the display vehicle 110 than the percentage of the longitudinal length $L_1$ of the actual vehicle 10 that is spanned by the first measurement region $R_1$. In this way the system 90 provides the driver with a clear graphical indication of the status of a body of water 20 relative to the entire length of the vehicle 10 which optionally has been derived from depth measurement data taken at only one longitudinal location (in region $R_1$) of the vehicle 10 (i.e. at the position of the side mirror sensor 14a). In FIG. 2 the display vehicle 110 of length $L_2$ has a display level 17 superimposed thereon, the length of which display level 17 is greater than 100% of the length $L_2$ of the display vehicle 110. In other envisaged embodiments, the display level 17 may span a percentage of between about 60% to about 150% of the length $L_2$ of the display vehicle 110.

Optionally, the display level 17 is a straight line, but in other embodiments it is envisaged that a slightly wavy line could be used to convey that the display line relates to the water level and to convey that the water is a fluid body. In such embodiments, the display level may be positioned relative to the display vehicle 110 such that at the scaled point on the display vehicle 110 that is equivalent to $R_1$, the display level represents the display depth. Alternatively, the display depth level may be shaped to show the bow wave 50.

In envisaged embodiments, the system may comprise additional water level sensors, which may be contact water level sensors such as ultrasonic sensors, capacitive, resistive or hydrostatic sensors, configured to measure at least a minimum depth of water in a region in close proximity to them. Such sensors may provide a guide or actual measurement as to the real water level at the front of the vehicle ($d_{front}$) and/or the real water level at the rear of the vehicle ($d_{rear}$) and the data obtained therefrom may be used in conjunction with the data gathered from one or two side mirror 40a, 40b mounted sensors 14a, 14b to determine a display depth and/or a display level. Additionally or alternatively the contact sensors (such as a submersion ultrasonic transducer) may provide an indication that the vehicle is wading and that aspects of the disclosed system should be activated.

In envisaged embodiments it is envisaged that other forms of remote water depth sensor may be utilized. Such remote sensors may for example include, but are not limited to, one or more or a combination of: acoustic, electromagnetic and optical type sensors to measure reflections from the surface of the water. Such contact sensors may optionally include liquid level measurement sensors, for example including but not limited to sensors measuring a change, due to the presence of water, in: pressure, electrical characteristic (for example capacitance, resistance, dielectric constant), electromagnetic (for example optical, including optic fibres) and radio frequency (time-of-flight).

In envisaged embodiments, a number other than three values is provided within the first series of values for the display vehicle positions. Similarly, a number other than three values is provided within the third series of values for categorizing the measured lateral gradient and such that more than three display vehicle positions for a front and/or elevation of a display vehicle are provided for selection. For example, in an arrangement of the invention, five identifiable and defined positions are provided for the side elevation of a display vehicle: one level position; two different nose-up positions; and two different nose-down positions.

In such an arrangement of the invention, the series of five positions may be defined as:

$$T_{TLA} \leq \theta_{long} \leq T_{FLA}, \qquad (1)$$

$$T_{FLA} < \theta_{long} < T_{SLA}, \qquad (2)$$

$$T_{FOLA} < \theta_{long} < T_{TLA}, \qquad (3)$$

$$T_{SLA} \leq \theta_{long} < T_{FILA}, \qquad (4)$$

$$T_{SILA} < \theta_{long} \leq T_{FOLA}, \qquad (5)$$

In words, definitions (1), (2) and (3) are provided above and (4) and (5) can be defined as:

(4) Display a side elevation of the display vehicle in a second nose up position if:
  (a) the measured longitudinal gradient is greater than or equal to the second longitudinal angle threshold; and
  (b) if the measured longitudinal gradient is less than a fifth longitudinal angle threshold.

(5) Display a side elevation of the display vehicle in a second nose down position if:
  (a) the measured longitudinal gradient is less than or equal to a fourth longitudinal angle threshold; and
  (b) if the measured longitudinal gradient is greater than a sixth longitudinal angle threshold.

In the above definitions, $T_{FLA}$ is a first longitudinal angle threshold, which optionally is about 4°; $T_{SLA}$ is a second longitudinal angle threshold, which is optionally about 7°; $T_{TLA}$ is a third longitudinal angle threshold, which is optionally about −4° (minus four degrees); $T_{FOLA}$ is a fourth longitudinal angle threshold, which is optionally about −7° (minus seven degrees); $T_{FILA}$ is a fifth longitudinal angle threshold, which is optionally about 10°; and $T_{SILA}$ is a sixth longitudinal angle threshold, which is optionally about −10° (minus ten degrees).

Additionally, in such an arrangement, the system, in at least some embodiments, is configured to trigger a holding display, optionally one comprising a side elevation of the display vehicle, if either of the following criteria is true: the measured longitudinal gradient $\theta_{long}$ is less than the sixth longitudinal angle threshold ($T_{SILA}$), or the measured longitudinal gradient $\theta_{long}$ greater than the fifth longitudinal angle threshold ($T_{FILA}$).

Optionally boundary conditions may apply to the triggering of the holding display. Such boundary conditions may require either of the above criteria to be true for a specified time period, for example 0.7 s; or for a specified number of consecutive samples.

It will be recognized that in the examples illustrated the HMI-apparatus illustrates an active display wherein a display vehicle is angled relative to a horizontal axis of the display and a water level is maintained as always substantially parallel to the horizontal axis of the display. Whereas this is arrangement, in other envisaged embodiments the HMI-apparatus illustrates a display vehicle that is always maintained in a horizontal position and the display water level is linearly extrapolated either side of the display depth, in dependence upon a determined display gradient. However, such an arrangement may not be as clearly understandable as the illustrated arrangement, wherein the position of the display vehicle is illustrated to generally represent the position of the actual vehicle.

In envisaged embodiments, the method may comprise consideration of a compound longitudinal and lateral angle of the vehicle. A compound longitudinal and lateral angle threshold may be set in order to determine a further criterion for which a holding display is used instead of an active display. The compound longitudinal and lateral angle threshold at which a holding display rather than an active display is used may be a combination of a measured longitudinal angle $\theta_{long}$ and measured lateral angle $\theta_{lat}$. In view of the compounded effect on an actual vehicle 10 of being at both a lateral and a longitudinal inclination and in consideration of the effect thereof on the accuracy of a measured water level, the compound longitudinal and lateral angle threshold limits may differ from the individual second and fourth longitudinal angle thresholds $T_{SLA}$, $T_{FOLA}$; and the individual second and fourth lateral angle thresholds $T_{SSA}$, $T_{FOSA}$ of the first embodiment, or the fifth and sixth longitudinal angle thresholds $T_{FILA}$, $T_{SILA}$ of the optional embodiment described above. Again calibration of a compound longitudinal and lateral angle threshold may vary in dependence upon vehicle design configuration and vehicle capability. In an exemplary and optional envisaged arrangement, the method also comprises displaying a holding display:

(a) if the measured longitudinal gradient $\theta_{long}$ is less than a seventh longitudinal angle threshold $T_{SELA}$ and if the measured lateral gradient $\theta_{lat}$ is less than a seventh lateral angle threshold $T_{SESA}$; or (b) if the measured longitudinal gradient $\theta_{long}$ is greater than an eighth longitudinal angle threshold $T_{FLA}$ and if the measured lateral gradient $\theta_{lat}$ is greater than an eighth lateral angle threshold $T_{ESA}$, wherein the seventh longitudinal angle threshold $T_{SELA}$ is optionally about −8°, wherein the seventh lateral angle threshold $T_{SESA}$ is optionally about −8°, wherein the eighth longitudinal angle threshold $T_{FLA}$ is optionally about 8°, and wherein the eighth lateral angle threshold $T_{ESA}$ is optionally about 8°.

It will be recognized that in setting compound longitudinal and lateral angle thresholds at which a holding display is utilized that the seventh longitudinal angle threshold $T_{SELA}$ and the seventh lateral angle threshold $T_{SESA}$ are not restricted to being the same as one another and that likewise that the eighth longitudinal angle threshold $T_{FLA}$ and eighth lateral angle threshold $T_{ESA}$ are not restricted to being the same as one another.

It will be appreciated upon reading the foregoing that categorizing a measured lateral, longitudinal or compound longitudinal and lateral angle using a value that identifies a position in which a display vehicle is presented (which position has a display lateral angle, display longitudinal angle or display compound longitudinal and lateral angle associated with it) represents an example of the manner in which an algorithm for processing measurement data may be set out. In other embodiments an assessment or categorization of measured data directly outputs a display lateral angle or a display longitudinal angle without going via an identifier value. In other embodiments the route from raw measurement data to deciding a graphic to output may comprise a greater number of steps. Nevertheless, in each embodiment, measurement data for lateral and/or longitudinal gradient is manipulated, analyzed or otherwise categorized and in dependence thereon a selection is made for a display graphic, wherein the number of selectable options for the angle of the display vehicle on a display graphic is significantly fewer than the number of values that the measurement data may take.

The invention claimed is:

1. A method of controlling a human machine interface apparatus to provide information to a driver of a vehicle to aid driver control of a vehicle when the vehicle is wading in a body of water, the method comprising:
   (i) determining, in dependence upon a sensed depth of water surrounding the vehicle, a display depth;
   (ii) determining one or more of:
      a measured longitudinal gradient of the vehicle and in dependence thereupon determining a display longitudinal gradient for a display vehicle illustrated on a human machine interface display of said human machine interface apparatus, wherein determining said display longitudinal gradient comprises determining in which one of a plurality of prescribed display ranges the measured longitudinal gradient falls, and in response thereto selecting a single predetermined display longitudinal gradient corresponding to the determined prescribed range; and
      a measured lateral gradient of the vehicle and in dependence thereupon determining a display lateral gradient for a display vehicle illustrated on a display by the human machine interface apparatus, wherein determining said display lateral gradient comprises determining in which one of a plurality of prescribed display ranges the measured lateral gradient falls and in response thereto selecting a single predetermined display lateral gradient corresponding to the determined prescribed range.

2. A method according to claim 1, further comprising displaying on a human machine interface display a display vehicle side elevation in one of the following positions relative to a notional horizontal axis of said display:
   a first nose up position;
   a first nose down position; or
   a longitudinally level position
in dependence upon the selected single predetermined display longitudinal gradient.

3. A method according to claim 2, comprising displaying one of:
   a side elevation of the display vehicle in said first nose up position when said measured longitudinal gradient is greater than a first longitudinal angle threshold; and when said measured longitudinal gradient is less than a second longitudinal angle threshold;
   a side elevation of the display vehicle in said first nose down position when said measured longitudinal gradient is less than a third longitudinal angle threshold and when said measured longitudinal gradient is greater than a fourth longitudinal angle threshold; and
   a side elevation of the display vehicle on an active display in said longitudinally level position when said measured longitudinal gradient is less than or equal to said first longitudinal angle threshold and when said measured longitudinal gradient is greater than or equal to said third longitudinal angle threshold.

4. A method according to claim 3, comprising displaying a side elevation of the display vehicle on a holding display when said measured longitudinal gradient is less than said fourth longitudinal angle threshold; or when said measured longitudinal gradient is greater than said second longitudinal angle threshold.

5. A method according to claim 3, comprising displaying one of:

a side elevation of the display vehicle in a second nose up position when said measured longitudinal gradient is greater than or equal to the second longitudinal angle threshold and when said measured longitudinal gradient is less than a fifth longitudinal angle threshold; and a side elevation of the display vehicle in a second nose down position when said measured longitudinal gradient is less than or equal to a fourth longitudinal angle threshold and i when f said measured longitudinal gradient is greater than a sixth longitudinal angle threshold.

6. A method according to claim 5, comprising displaying a side elevation of the display vehicle on a holding display when said measured longitudinal gradient is less than said sixth longitudinal angle threshold, or when said measured longitudinal gradient is greater than said fifth longitudinal angle threshold.

7. A method according to claim 3 wherein said first longitudinal angle threshold is 4°; and/or said second longitudinal angle threshold is 10°; and/or said third longitudinal angle threshold is −4° (minus four degrees); and/or said fourth longitudinal angle threshold is −10° (minus ten degrees).

8. A method according to claim 2 further comprising determining a measured lateral gradient of the vehicle and displaying a side elevation of the display vehicle on a holding display when said measured lateral gradient exceeds one of a positive and a negative predetermined lateral gradient threshold.

9. A method according to claim 1, further comprising displaying at least one of a display vehicle front elevation and a display vehicle rear elevation on said human machine interface display in one of the following positions to a notional horizontal axis of said display:
a first right-hand side low position;
a first left-hand side low position; or
a laterally level position;
in dependence upon the selected predetermined display lateral gradient.

10. A method according to claim 9, comprising displaying one of:
said at least one of a front and a rear display vehicle elevation in said first right-hand side low position when said measured lateral gradient is greater than a first lateral angle threshold and when said measured lateral gradient is less than a second lateral angle threshold;
said at least one of a front and a rear display vehicle elevation in said first left-hand side low position when said measured lateral gradient is less than a third lateral angle threshold and when said measured lateral gradient is greater than a fourth lateral angle threshold; and
said at least one of a front and a rear display vehicle elevation on an active display in said laterally level position when said measured lateral gradient is less than or equal to said first lateral angle threshold and when said measured lateral gradient is greater than or equal to said third lateral angle threshold.

11. A method according to claim 10 comprising:
displaying said at least one of a front and a rear elevation of the display vehicle in a second right-hand side low position when said measured lateral gradient is greater than or equal to the second lateral angle threshold and when said measured lateral gradient is less than a fifth lateral angle threshold;
displaying said at least one of a front and a rear elevation of the display vehicle in a second left-hand side low position when said measured lateral gradient is less than or equal to a fourth lateral angle threshold and when said measured lateral gradient is greater than a sixth lateral angle threshold.

12. A method according to claim 10 wherein said first lateral angle threshold is 5°; and/or said second lateral angle threshold is 10°; and/or said third lateral angle threshold is −5° (minus five degrees); and/or said fourth lateral angle threshold is −10° (minus ten degrees).

13. A method according to claim 2 further comprising determining a speed of the vehicle and displaying a side elevation of the display vehicle on a holding display when said measured longitudinal gradient exceeds a speed dependant longitudinal gradient threshold.

14. A method according to claim 2 further comprising: superimposing, in dependence on said determined display depth, a display level on the elevation of the display vehicle.

15. A method according to claim 14 wherein said display level is a scaled and linear extrapolation of said display depth and is positioned parallel to a notional horizontal axis of said display.

16. A method according to claim 6, wherein the method further comprises visually contrasting said holding display from said active display.

17. A method according to claim 16 wherein said holding display is visually contrasted from said active display by the display vehicle having a greater fading or being more transparent in said holding display than in said active display.

18. A method according to claim 1 further comprising, in dependence upon one or more vehicle parameters, including said measured lateral gradient and/or said measured longitudinal gradient:
(a) populating the human machine interface apparatus with an active display comprising an illustration of said display depth; or
(b) populating the human machine interface apparatus with a holding display; or
(c) populating the human machine interface apparatus with a failure display.

19. A method according to claim 18 wherein said one or more vehicle parameters includes vehicle speed and/or vehicle direction and/or water temperature.

20. A method according to claim 19, wherein no display level is superimposed upon the display vehicle in the holding display.

21. A method according to claim 20 wherein said failure display comprises a textual warning for conveying to the driver that the human machine interface apparatus is not functioning properly.

22. A system configured and arranged for carrying out the method of claim 1, the system comprising:
a measurement apparatus comprising at least one sensor for measuring a depth of water; and
a display system comprising a human machine interface apparatus; and
a processor coupled to the human machine interface apparatus and coupled to the measurement apparatus wherein said processor is configured to perform the method according to claim 1.

23. A system according to claim 22 wherein, in determining a display depth the processor compensates for at least one of a currently selected vehicle ride height and a vehicle speed.

24. A vehicle comprising a system according to claim 22.

25. A vehicle according to claim 22 wherein the measurement apparatus comprises at least two remote water surface detection sensors: a first sensor disposed on one side of the vehicle; and a second sensor disposed on the other side of the vehicle said first and second sensors providing over time, to the processor: a first data signal indicative of a first depth of said water on one side of the vehicle; and a second data signal indicative of a second measured depth of water on the other side of the vehicle.

26. A vehicle according to claim 24 wherein the first and second sensors are mounted to a left side mirror and right side mirror of the vehicle respectively and are each ultrasonic transducer sensors.

27. A program for a processor for use in a system according to claim 22 for aiding driver control of the vehicle when the vehicle is wading, the program configured and arranged such that when running on the processor, the processor is configured to perform the method of claim 1.

28. A method, according to claim 1 as herein described with reference to and/or as illustrated by the accompanying drawings.

\* \* \* \* \*